(12) United States Patent
Kakuta et al.

(10) Patent No.: US 7,129,019 B2
(45) Date of Patent: *Oct. 31, 2006

(54) OPTICAL INFORMATION RECORDING MEDIUM

(75) Inventors: Takeshi Kakuta, Kanagawa (JP); Shinji Saito, Kanagawa (JP); Toshio Ishida, Kanagawa (JP); Takako Ozawa, Kanagawa (JP); Hiroaki Doushita, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/176,088

(22) Filed: Jun. 21, 2002

(65) Prior Publication Data

US 2003/0031954 A1    Feb. 13, 2003

(30) Foreign Application Priority Data

| Jun. 22, 2001 | (JP) | ............................. 2001-190402 |
| Aug. 31, 2001 | (JP) | ............................. 2001-262814 |
| Sep. 4, 2001 | (JP) | ............................. 2001-267684 |
| Sep. 12, 2001 | (JP) | ............................. 2001-276915 |

(51) Int. Cl.
  *G11B 7/24* (2006.01)
(52) U.S. Cl. ............ 430/270.16; 430/945; 430/270.15; 430/270.2; 369/275.5; 369/288; 428/64.8
(58) Field of Classification Search ............ 430/270.16, 430/945; 369/275.5, 288; 428/64.8
See application file for complete search history.

(56) References Cited

U.S. PATENT DOCUMENTS

| 4,412,231 A | 10/1983 | Namba et al. |
| 4,458,004 A | 7/1984 | Tanikawa |
| 4,465,767 A * | 8/1984 | Oba et al. .............. 430/270.11 |
| 4,871,408 A | 10/1989 | Honma et al. |
| 5,075,145 A | 12/1991 | Yamamoto et al. |
| 5,332,608 A | 7/1994 | Tsuji et al. |
| 5,340,698 A | 8/1994 | Hirata et al. |
| 5,490,131 A | 2/1996 | Ohta et al. |
| 5,747,413 A | 5/1998 | Amano et al. |
| 5,763,868 A | 6/1998 | Kubota et al. |

(Continued)

FOREIGN PATENT DOCUMENTS

EP    0 653 685 A1    5/1995

(Continued)

OTHER PUBLICATIONS

Keep Schep, et al., ISOM 2000, International Symposium on Optical Memory 2000, c/0 Business Center for Academic Societies Japan, Technical Digest.

(Continued)

*Primary Examiner*—Martin Angebranndt
(74) *Attorney, Agent, or Firm*—Sughrue Mion, PLLC

(57) ABSTRACT

The present invention provides an optical information recording medium that includes a substrate including a groove with a track pitch of 200 to 400 nm and a groove depth of 20 to 150 nm and having successively disposed thereon a light reflecting layer, a recording layer containing a dye in which information is recorded by irradiation with a laser beam having a wavelength of no greater than 450 nm, an adhesive layer, and a cover layer with a thickness of 0.01 to 0.5 mm. A surface of the optical information recording medium on a side disposed with the cover layer has a center surface average roughness (SRa1) of no greater than 3.0 nm when measured over a large surface area and a center surface average roughness (SRa2) of no greater than 3.0 nm when measured over a minute surface area.

9 Claims, 1 Drawing Sheet

U.S. PATENT DOCUMENTS

| | | | |
|---|---|---|---|
| 5,798,161 A | 8/1998 | Kita et al. | |
| 5,806,388 A | 9/1998 | Imataki | |
| 5,882,760 A | 3/1999 | Hatwar et al. | |
| 5,962,181 A | 10/1999 | Daems et al. | |
| 5,965,229 A | 10/1999 | Zhou et al. | |
| 5,968,708 A | 10/1999 | Yashiro et al. | |
| 6,023,451 A * | 2/2000 | Kashiwagi et al. | 369/275.5 |
| 6,049,521 A | 4/2000 | Aratani | |
| 6,051,289 A | 4/2000 | Tsujimoto et al. | |
| 6,136,751 A | 10/2000 | Harada | |
| 6,221,455 B1 | 4/2001 | Yasuda et al. | |
| 6,228,455 B1 * | 5/2001 | Huang et al. | 428/64.1 |
| 6,246,656 B1 * | 6/2001 | Kawakubo et al. | 369/112.23 |
| 6,269,072 B1 | 7/2001 | Ohgo | |
| 6,353,592 B1 * | 3/2002 | Kashiwagi et al. | 369/283 |
| 6,506,469 B1 * | 1/2003 | Takahashi et al. | 428/64.1 |
| 6,572,947 B1 | 6/2003 | Sabi et al. | |
| 6,576,320 B1 | 6/2003 | Hayashida et al. | |
| 6,627,288 B1 * | 9/2003 | Ogiso et al. | 428/64.1 |
| 6,661,770 B1 * | 12/2003 | Kakuta et al. | 369/275.4 |
| 6,699,591 B1 | 3/2004 | Ishida et al. | |
| 6,731,592 B1 | 5/2004 | Usami | |
| 6,767,987 B1 | 7/2004 | Okazaki | |
| 6,808,782 B1 * | 10/2004 | Usami et al. | 428/64.1 |
| 6,811,850 B1 | 11/2004 | Hirata | |
| 2001/0044002 A1 | 11/2001 | Shingai et al. | |
| 2002/0044523 A1 * | 4/2002 | Oshima et al. | 369/272 |
| 2002/0076648 A1 | 6/2002 | Berneth et al. | |
| 2002/0122379 A1 | 9/2002 | Tamada et al. | |
| 2002/0145967 A1 | 10/2002 | Fujii et al. | |
| 2003/0003261 A1 * | 1/2003 | Saito et al. | 428/64.4 |
| 2003/0017295 A1 | 1/2003 | Ishida et al. | |
| 2003/0031954 A1 | 2/2003 | Kakuta et al. | |
| 2003/0081537 A1 | 5/2003 | Shinotsuka | |
| 2003/0082331 A1 | 5/2003 | Ishida et al. | |
| 2003/0090990 A1 | 5/2003 | Ozawa et al. | |
| 2003/0116266 A1 | 6/2003 | Kitano et al. | |
| 2003/0118938 A1 | 6/2003 | Ishida et al. | |
| 2003/0148215 A1 | 8/2003 | Kakuta et al. | |
| 2003/0183511 A1 | 10/2003 | Kakuta et al. | |
| 2004/0125739 A1 | 7/2004 | Usami et al. | |

FOREIGN PATENT DOCUMENTS

| | | |
|---|---|---|
| EP | 0 837 459 | 4/1998 |
| EP | 0 871 164 A2 | 10/1998 |
| EP | 1 017 045 A1 | 7/2000 |
| EP | 1 047 055 A1 | 10/2000 |
| EP | 1 065 663 A2 | 1/2001 |
| EP | 1 083 555 A | 3/2001 |
| EP | 1 103 962 A | 5/2001 |
| EP | 1 154 413 | 11/2001 |
| EP | 1191525 | 3/2002 |
| EP | 1 271 499 A2 | 1/2003 |
| JP | 60-204395 | 10/1985 |
| JP | 02-196689 | 8/1990 |
| JP | 04-064936 * | 2/1992 |
| JP | 06-044608 | 2/1994 |
| JP | 7-266703 | 10/1995 |
| JP | 08-045125 * | 2/1996 |
| JP | 09-147418 A | 6/1997 |
| JP | 09147418 A | 6/1997 |
| JP | 11-31337 | 2/1999 |
| JP | 11-120617 | 4/1999 |
| JP | 11-138993 | 5/1999 |
| JP | 2000-067468 A | 3/2000 |
| JP | 2000-285520 | 10/2000 |
| JP | 2000-311392 | 11/2000 |
| JP | 2001-043566 | 2/2001 |
| JP | 2001-155383 | 6/2001 |
| JP | 2001-243658 A | 9/2001 |
| WO | WO 02/054399 A1 | 7/2002 |

OTHER PUBLICATIONS

Patent Abstracts of Japan, vol. 018, No. 278 (P-1743), May 26, 1994 & JP 06 044608A, Feb. 18, 1994 Abstract.

* cited by examiner

OPTICAL INFORMATION RECORDING MEDIUM

BACKGROUND OF THE INVENTION

1. Field of the Invention

The present invention relates to an optical information recording medium, and particularly to an optical information recording medium rewritable in a heat mode.

2. Description of the Related Art

With the beginning of BS (Broadcast Satellite) digital broadcasting in high definition television (HDTV) image quality just around the corner, the development of large capacity recording media, capable of recording BS digital broadcasting in HDTV image quality for about 2 hours, is advancing. In an optical disc for a violet laser beam source, regarded as having high potential as the next generation of optical disc, a recording layer is formed on a substrate by coating a thin cover layer having a thickness of 0.1 mm to 0.3 mm. In a system using the optical disc, the laser beam is throttled using an objective lens with a high numerical aperture (hereinafter referred simply as to NA) of 0.65 or higher for a pickup, and recording is carried out by irradiation with a laser beam from a thin cover layer side of the optical disc to achieve a one-sided recording capacity as high as 22.5 GB.

Also, with respect to ISOM 2000 (International Symposium on Optical Memory 2000), DVR-Blue, which is a phase change medium using a violet laser, has been released.

However, in developing such an optical disc for use with a violet laser light source, one method employed for increasing a density of the optical recording medium has been to shorten the wavelength of the laser to be employed and to increase the NA of the objective lens. In such a case, a laser spot becomes small and a distance between the pickup and the medium (a working distance) is narrowed, so that a problem occurs in that a roughness of the medium surface, which scarcely has any effect in the case of a conventional optical recording medium, does have effects on this medium.

In other words, if the slight unevenness of the recording medium surface is significant, diffused reflection of light from the medium surface occurs, resulting in problems such as decreased reflectivity, deterioration in the shape of marks to be recorded, and lowered C/N and jitter. Over a wider area, it is observed that a focus margin and a tilt margin are narrowed when the roughness (waviness) is great, and further that the disc and the pickup, which generally do not make contact, are brought into momentary contact with each other due to surface movement and tremor of the disc. Accordingly, the disc surface is easily scratched causing errors at the time of reproduction (playback).

As described above, a high density optical information recording medium (DVD), capable of recording and reproducing a large quantity of text information, image information, and audio information, is increasingly in demand, and, in particular, research of even greater density recording using an optical information recording medium is being carried out in order to record digital high vision TV broadcasting. As a method for performing high density optical recording, the wavelength of a laser beam employed for recording and reproducing with the optical information recording medium has been further shortened and the numerical aperture (NA) of an objective lens employed in an optical system of a recording and reproducing apparatus has been further widened.

A previously known phase change type optical disc, comprises an alloy layer, such as GeSbTe, as a recording layer, and recording and reproducing are carried out by irradiating the recording layer with a laser beam to instantaneously heat the irradiated portion and change a state thereof from a crystalline state to an amorphous state and by utilizing the changed reflectivity resulting from the phase change. Recently, the DVR-Blue system, in which recording and reproducing are carried out by a violet laser using a recording layer of the phase change type, was disclosed (ISOM 2000, pp. 210–211).

This system employs a land-groove recording method, which refers to a method for carrying out recording at both groove portions of a guiding groove for a laser beam and land portions (hill portions) formed on a substrate and which is a recording method employed for DVR-RAMs (rewritable type). On the other hand, DVDs include those of DVD-RW (rewritable type) and DVD+RW (rewritable type) standards, and a groove recording method for carrying out recording only in the groove is employed.

As compared with the groove recording method, the land-groove recording method is suitable for achieving high density since a track pitch is easily increased. The recording tracks, however, are so close to one another that problems such as cross erasing and cross stroking affecting tracks already recorded by the laser are apt to take place when recording is carried out in tracks adjacent to the already recorded tracks. Furthermore, conversion to DVD-ROM is difficult.

In order to solve such problems, a phase change medium for DVR-Blue, in which a method of recording only in grooves is employed, has been disclosed [ODS (Optical Data Storage) 2001, pp. 139–141].

Further, among DVDs, a writable DVD-R, capable of undergoing recording once, is known. Since a dye is applied for recording on the DVD-R, the DVD-R utilizes a groove recording method allowing easy dye accumulation and having balanced properties.

Generally, when the wavelength of the laser beam to be employed is shortened and the NA of the objective lens is increased, the common energy of the light increases in inverse proportion to the wavelength. Accordingly, when the wavelength of the laser beam is shortened in order to increase the density, the light energy radiated to the medium is increased. Therefore, durability with respect to repeat reproduction becomes an issue. In order to assure reproduction durability, a method of lowering the laser output at the time of reproduction can be used. When the reproduction output is lowered, however, the reflectivity is decreased, resulting in RF output decrease, C/N decrease, and jitter deterioration.

A DVD-R is manufactured by applying a dye to a substrate A to form a light reflective layer, subsequently forming a protective layer, and adhering the resulting substrate to another substrate B. At the time of recording and reproducing, a laser beam is radiated to groove portions (convex portions, when observed from a substrate A side of the medium) from the substrate A side. Generally, the dye is thicker in the groove portions, and, from the standpoint of shape, heat accumulates more easily in the groove portions at the time of laser beam irradiation. As a result, the groove portions are superior to land portions (concave portions, when observed from the substrate A side of the medium) in modulation degree, C/N, and jitter.

In the DVR-Blue system, a light reflective layer is formed only on a substrate A, a dye is further applied thereto, and a cover layer is formed thereon. Recording and reproducing are carried out by radiating a laser beam from a cover layer side, and, in contrast to a conventional DVD, the groove portions are concave portions when observed from the cover layer side. Such a structure, therefore, leads to problems including RF output decrease, C/N decrease, and jitter deterioration.

SUMMARY OF THE INVENTION

The present invention aims to solve such problems as those described above. Thus, an object of the invention is to provide a high density optical information recording medium having excellent recording properties, to provide an optical information recording medium having desirable jitter and a disc surface with improved scratch resistance, and to provide an optical information recording medium having an organic dye-containing recording layer, wherein the optical information recording medium is of a DVR-Blue type and excellent without suffering reproduction deterioration, RF output decrease, C/N decrease, and jitter deterioration.

According to the results of the enthusiastic investigations carried out to solve the above-described problems, inventors of the invention have found out that an optical information recording medium with excellent recording properties can be obtained by defining the center surface average roughness of the cover layer side surface of the optical information recording medium by the surface roughness in a large surface area and a minute surface area and that an optical information recording medium with excellent recording properties can be obtained by defining the number of projections in the cover layer of the optical information recording medium, and with respect to an optical information recording medium comprising an organic dye-containing recording layer, by the enthusiastic investigations of the width and the height of a land part of a substrate and the thickness of an adhesive layer and by recording in the land part, an optical information recording medium with excellent properties without reproduction deterioration in DVR-Blue system, RF output decrease, C/N decrease, and jitter deterioration can be obtained.

That is, the above-described problems can be solved by the following means.

According to a first aspect of the invention, there is provided an optical information recording medium comprising a substrate including a groove with a track pitch of 200 to 400 nm and a groove depth of 20 to 150 nm and having successively disposed on a surface thereof a light reflective layer, a recording layer containing a dye in which information is recorded by irradiation with a laser beam having a wavelength of no greater than 450 nm, an adhesive layer, and a cover layer with a thickness of 0.01 to 0.5 mm, wherein a surface of the optical information recording medium on a side disposed with the cover layer has a center surface average roughness (SRa1) of no greater than 3.0 nm when measured over a large surface area and a center surface average roughness (SRa2) of no greater than 3.0 nm when measured over a minute surface area.

A second aspect of the invention provides an optical information recording medium, according to the first aspect, further comprising at least one overcoated layer, containing a radiation-curable resin, disposed on the cover layer.

A third aspect of the invention provides an optical information recording medium, according to the first aspect, wherein the substrate contains at least one substance selected from the group consisting of glass, polycarbonate, acrylic resin, polyvinyl chloride, vinyl chloride-based resin, epoxy resin, amorphous polyolefin, polyester, and aluminum.

A fourth aspect of the invention provides an optical information recording medium, according to the first aspect, further comprising an undercoated layer disposed on the substrate surface of the side disposed with the light reflective layer.

A fifth aspect of the invention provides an optical information recording medium, according to the first aspect, wherein the light reflective layer contains at least one light reflecting substance selected from the group consisting of Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, Bi and stainless steel.

A sixth aspect of the invention provides an optical information recording medium, according to the first aspect, wherein the dye contained in the recording layer has one or more maximum absorption peaks, at least one of which has a maximum absorption wavelength of no greater than 400 nm.

A seventh aspect of the invention provides an optical information recording medium, according to the first aspect, wherein the dye contained in the recording layer is selected from the group consisting of a cyanine dye, an oxonol dye, a metal complex-based dye, an azo dye, and a phthalocyanine dye.

An eighth aspect of the invention provides an optical information recording medium, according to the first aspect, wherein the cover layer contains at least one substance selected from the group consisting of polycarbonate, cellulose triacetate, and polyethylene terephthalate.

A ninth aspect of the invention provides an optical information recording medium, according to the first aspect, wherein the surface on the side disposed with the cover layer has a center surface average roughness (SRa1) of no greater than 1.5 nm when measured over a large surface area and a center surface average roughness (SRa2) of no greater than 1.5 nm when measured over a minute surface area.

A tenth aspect of the invention provides an optical information recording medium, according to the second aspect, wherein the radiation-curable resin contained in the overcoated layer is selected from the group consisting of acrylate compounds, acrylamides, methacrylate compounds, methacrylic acid amides, vinyl ethers, and vinyl esters.

An eleventh aspect of the invention provides an optical information recording medium comprising a substrate including a groove with a track pitch of 200 to 400 nm and a groove depth of 20 to 150 nm and having successively disposed on a surface thereof a light reflective layer, a recording layer on which information is recorded by irradiation with a laser beam having a wavelength of no greater than 450 nm, an adhesive layer containing an adhesive, and a cover layer with a thickness of 0.01 to 0.5 mm, wherein a surface of the cover layer has at least 15 projections with a height of at least 20 nm per 30 $\mu m^2$ and 1 to 5 of the projections have a height of at least 100 nm.

A twelfth aspect of the invention provides an optical information recording medium, according to the eleventh aspect, wherein the substrate contains at least one substance selected from the group consisting of glass, polycarbonate, acrylic resin; polyvinyl chloride, vinyl chloride-based resin, epoxy resin, amorphous polyolefin, polyester, and aluminum.

A thirteenth aspect of the invention provides an optical information recording medium, according to the eleventh aspect, further comprising an undercoated layer disposed on the substrate surface of the side disposed with the light reflective layer.

A fourteenth aspect of the invention provides an optical information recording medium, according to the eleventh aspect, wherein the light reflective layer contains at least one light reflecting substance selected from the group consisting of Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, Bi and stainless steel.

A fifteenth aspect of the invention provides an optical information recording medium, according to the eleventh aspect, wherein the dye contained in the recording layer has one or more maximum absorption peaks, at least one of which has a maximum absorption wavelength of no greater than 400 nm.

A sixteenth aspect of the invention provides an optical information recording medium, according to the eleventh aspect, wherein the recording layer contains a dye selected from the group consisting of a cyanine dye, an oxonol dye, a metal complex-based dye, an azo dye, and a phthalocyanine dye.

A seventeenth aspect of the invention provides an optical information recording medium, according to the eleventh aspect, wherein the cover layer contains at least one substance selected from the group consisting of polycarbonate, cellulose triacetate, and polyethylene terephthalate.

An eighteenth aspect of the invention provides an optical information recording medium, according to the eleventh aspect, wherein the surface of the cover layer has 15 to 100 projections with a height of at least 20 nm per 30 $\mu m^2$ and 1 to 4 of the projections have a height of 100 nm or higher.

A nineteenth aspect of the invention provides an optical information recording medium comprising a substrate including a land with a track pitch of 200 to 400 nm, a land height of 20 to 100 nm, and a land width of 80 to 220 nm and having successively disposed on a surface thereof at least a light reflective layer, a recording layer containing an organic dye, and a protective layer, wherein the protective layer has a thickness of 75 to 130 $\mu m$ and recording and reproducing are carried out on the land through the protective layer using a laser beam with a wavelength of no greater than 450 nm and an objective lens with a numerical aperture (NA) of no less than 0.7.

A twentieth aspect of the invention provides an optical information recording medium, according to the nineteenth aspect, wherein the land of the substrate has a track pitch of 260 to 340 nm, a land height of 30 to 80 nm, and a land width of 120 to 180 nm.

A twenty first aspect of the invention provides an optical information recording medium, according to the nineteenth aspect, wherein the substrate contains at least one substance selected from the group consisting of polycarbonate, acrylic resin, polyvinyl chloride, vinyl chloride-based resin, epoxy resin, amorphous polyolefin, and polyester.

A twenty second aspect of the invention provides an optical information recording medium, according to the nineteenth aspect, further comprising an undercoated layer disposed on the substrate surface of the side disposed with the light reflective layer.

A twenty third aspect of the invention provides an optical information recording medium, according to the nineteenth aspect, wherein the light reflective layer contains at least one light reflecting substance selected from the group consisting of Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, Bi and stainless steel.

A twenty fourth aspect of the invention provides an optical information recording medium, according to the nineteenth aspect, wherein the dye contained in the recording layer is selected from the group consisting of phthalocyanine-based dyes, benzotriazole-based dyes, and aminobutadiene-based dyes.

A twenty fifth aspect of the invention provides an optical information recording medium, according to the nineteenth aspect, wherein the protective layer comprises an adhesive layer, disposed on the recording layer, and a cover film, attached to the recording layer via the adhesive layer.

A twenty sixth aspect of the invention provides an optical information recording medium, according to the nineteenth aspect, wherein the protective layer is formed by providing a curable resin on the recording layer and curing the resin.

A twenty seventh aspect of the invention provides an optical information recording medium, according to the nineteenth aspect, wherein the recording layer is further disposed with a sputtered layer on one or both sides thereof.

A twenty eighth aspect of the invention provides an optical information recording medium, according to the nineteenth aspect, further comprising an auxiliary protective layer disposed on the protective layer.

BRIEF DESCRIPTION OF THE DRAWINGS

In FIG. 1, Tp represents a track pitch; Lh represents a land part height; and Lw represents a land part width.

Figure 1:
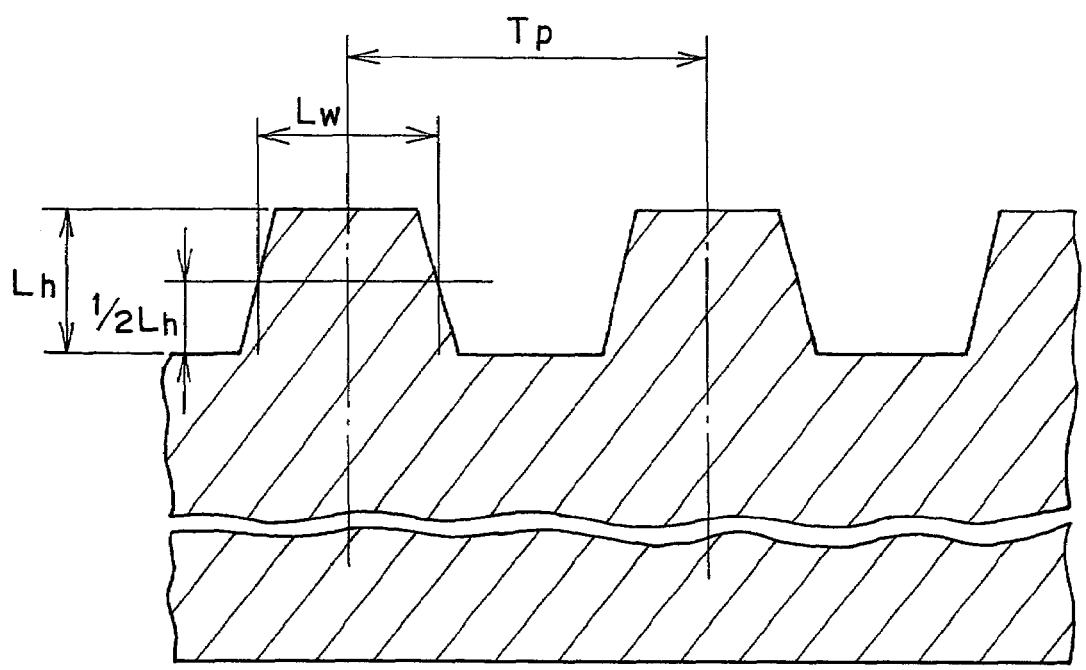
FIG. 1 is a schematic cross-sectional view showing the cross-section of a substrate in a plane vertical to the extension direction of the land in the fourth aspect of an optical information recording medium of the invention.

DESCRIPTION OF THE PREFERRED EMBODIMENTS (Optical Information Recording Medium)

<First Embodiment>

A first embodiment of an optical information recording medium of the present invention (hereinafter, referred simply as to the first embodiment) is characterized in that the recording medium comprises a substrate including a groove with a track pitch of 200 to 400 nm and a groove depth of 20 to 150 nm and having successively disposed on a surface thereof a light reflective layer, a recording layer containing a dye in which information is recorded by irradiation with a laser beam having a wavelength of no greater than 450 nm, an adhesive layer, and a cover layer with a thickness of 0.01 to 0.5 mm, wherein a surface of the optical information recording medium on a side disposed with the cover layer has a center surface average roughness (SRa1) of no greater than 3.0 nm when measured over a large surface area and a center surface average roughness (SRa2) of no greater than 3.0 nm when measured over a minute surface area. Hereinafter, the respective layers of the first embodiment will be described.

[Substrate]

For the substrate in the first embodiment of the invention, any kind of material employed for a substrate material of a conventional optical information recording medium may optionally be selected and employed.

Specific examples are glass; acrylic resin such as polycarbonate, polymethyl methacrylate; vinyl chloride-based resin such as polyvinyl chloride, vinyl chloride copolymer and the like; epoxy resin; amorphous polyolefin; polyester; metals such as aluminum; and the like and if necessary, they may be used in combination.

Among the above-described materials, from the viewpoint of the humidity resistance, the size stability, and the low cost, amorphous polyolefin and polycarbonate are preferable and polycarbonate is particularly preferable. The thickness of the substrate is preferably 1.1±0.3 mm.

In the substrate, guiding grooves for tracking or pre-grooves for expressing information such as address signals or the like are formed. In order to further increase a recording density, it is preferable to use a substrate having pre-grooves with narrower track pitches than those of CD-R and DVD-R. The track pitches of the pre-grooves are required to be in a range from 200 to 400 nm, preferably 280 to 350 nm. The depth of the pre-grooves (the groove depth) is required to be in a range from 20 to 150 nm, preferably 30 to 75 nm.

For the purpose to improve the flatness and the adhesive force, an undercoated layer is preferably formed on the substrate surface in the side where a light reflective layer, which will be described later, is to be formed.

The material for the undercoated layer includes, for example, polymer substances such as polymethyl methacrylate, acrylic acid-methacrylic acid copolymer, styrene-maleic acid anhydride copolymer, polyvinyl alcohol, N-methylolacrylamide, styrene-vinyltoluene copolymer, chlorosulfonated polyethylene, nitrocellulose, polyvinyl chloride, chlorinated polyolefin, polyester, polyimide, vinyl acetate-vinyl chloride copolymer, ethylene-vinyl acetate copolymer, polyethylene, polypropylene, polycarbonate and the like; surface modifiers such as silane coupling agent and the like.

The undercoated layer can be formed by preparing a coating solution by dissolving or dispersing the above-described materials in a proper solvent and applying the coating solution to the substrate surface by a coating method such as spin coating, a dip coating, an extrusion coating or the like. The thickness of the undercoated layer is generally in a range from 0.005 to 20 μm, preferably 0.01 to 10 μm.

[Light Reflective Layer]

A light reflecting substance to be employed for the light reflective layer of the first embodiment of the invention may be any as long as it has a reflectivity of laser beam of 70% or higher.

The foregoing light reflecting substance having the reflectivity of laser beam of 70% or higher includes a metal and a semi-metal such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi and a stainless steel. These light reflecting substances may be used alone or in combination of two or more kinds of them or in form of an alloy. Among them, preferable ones are Au, Ag, or an alloy of Au or Ag and particularly preferable ones are Au, Ag, or an alloy containing Au or Ag as a main component.

The light reflective layer can be formed by a vapor-phase deposition, sputtering or ion plating method of the above-described light reflecting substances on a substrate. The thickness of the light reflective layer is generally in a range of 10 to 300 nm, preferably 50 to 200 nm.

[Recording Layer]

The recording layer of the first embodiment of the invention is formed on the light reflective layer and containing a dye as a recording substance capable of recording the information by laser beam with wavelength of 450 nm or shorter. The dye to be contained in the recording layer includes a cyanine dye, an oxonol dye, a metal complex-based dye, an azo dye, a phthalocyanine dye and the like and among them, the phthalocyanine dye is preferable.

The dye contained in the recording layer is preferable to have one or more maximum absorption peaks, at least one of which has a maximum absorption wavelength of no greater than 400 nm, and more preferably no greater than 380 nm.

By selecting a dye having such a maximum absorption wavelength, highly sensitive recording can be made in the case of recording and reproducing of information by laser beam with wavelength of 450 nm or shorter, especially with wavelength of 390 to 450 nm, and the reflectivity at the time of reproduction can be heightened to advantageously give a high C/N.

Dyes described in Japanese Patent Application Laid-Open (JP-A) Nos. 4-74690, 8-127174, 11-53758, 11-334204, 11-334205, 11-334206, 11-334207, 2000-43423, 2000-108513, 2000-158818 and the like are preferably used.

The recording layer can be formed by preparing a coating solution by dissolving a recording substance such as a dye together with a binder or the like in a proper solvent, applying the coating solution to the light reflective layer formed on the substrate surface to form a coating film and then drying the coating film. The concentration of the recording substance in the coating solution is generally in a range of 0.01 to 15% by weight, preferably 0.1 to 10% by weight, more preferably 0.5 to 5% by weight, and most preferably 0.5 to 3% by weight.

The solvent for the coating solution includes esters such as butyl acetate, ethyl lactate, 2-methoxyethyl acetate and the like; ketones such as methyl ethyl ketone, cyclohexanone, methyl isobutyl ketone and the like; chloro hydrocarbons such as dichloromethane, 1,2-dichloroethane, chloroform and the like; amides such as dimethylformamide; hydrocarbons such as methylcyclohexane; ethers such as tetrahydrofuran, ethyl ether, dioxane, and the like; alcohols such as ethanol, n-propanol, isopropanol, n-butanol, diacetone alcohol and the like; fluoro solvents such as 2,2,3,3-tetrafluoropropanol and the like; glycol ethers such as ethylene glycol monomethyl ether, ethylene glycol monoethyl ether, propylene glycol monomethyl ether and the like.

Taking the solubility of the recording substance to be used into consideration, the solvents may be used alone or in combination with two or more of them. The coating solution may further contain a variety of additives such as an antioxidant, an ultraviolet ray absorber, a plasticizer, a lubricant and the like according to the purpose.

In the case a binder is used, the examples of the binder include natural organic polymer substances such as gelatin, a cellulose derivative, dextran, rosin, rubber and the like; synthetic organic polymers of primary condensation products of hydrocarbon-based resin such as polyethylene, polypropylene, polystyrene, polyisobutylene, and the like; vinyl-based resin such as polyvinyl chloride, polyvinylidene chloride, polyvinyl chloride-polyvinyl acetate copolymer; acrylic resin such as polymethyl acrylate, polymethyl methacrylate; heat-curable resin such as polyvinyl alcohol, polyethylene chloride, epoxy resin, butyral resin, rubber derivative, and phenol-formaldehyde resin. In the case of using the binder as a material for the recording layer, the use amount of the binder is generally in a range of 0.01 to 50 times (by weight), preferably 0.1 to 5 times (by weight), as much as the recording substance. The concentration of the recording substance in the coating solution to be prepared in such a manner is generally in a range of 0.01 to 10% by weight, preferably 0.1 to 5% by weight.

As the coating method, a spraying method, a spin coating method, a dipping method, a roll coating method, a blade coating method, a doctor roll method, a screen printing method, and the like can be exemplified. The recording layer may be a single layer or a multi-layer. The layer thickness of the recording layer is generally in a range of 20 to 500 nm, preferably in a range of 30 to 300 nm, and more preferably in a range of 50 to 100 nm.

In order to improve the photoresistance of the recording layer, a variety of anti-decoloration agents may be added to the recording layer.

As the anti-decoloration agents, a single state oxygen quencher is generally employed. As the single state oxygen quencher, those described in known published matters such as patent specifications may be employed.

Specific examples are those described in JP-A Nos. 58-175693, 59-81194, 60-18387, 60-19586, 60-19587, 60-35054, 60-36190, 60-36191, 60-44554, 60-44555, 60-44389, 60-44390, 60-54892, 60-47069, 63-209995, 4-25492, Japanese Patent Application Publication (JP-B) Nos. 1-38680, 6-26028, Germany Patent No. 350,399, and Japan Chemical Associate Journal, October issue, 1992, p. 1141.

The use amount of the anti-coloration agent such as the single state oxygen quencher is generally in a range of 0.1 to 50% by weight, preferably in a range of 0.5 to 45% by weight, more preferably in a range of 3 to 40% by weight, and most preferably in a range of 5 to 25% by weight with respect to the amount of the dye.

[Adhesive Layer]

The adhesive layer of the first embodiment of the invention is formed in order to increase the adhesive strength between the above-described recording layer and the cover layer will be described later. The adhesive to form the adhesive layer is preferably an ultraviolet ray-curable resin or a pressure sensitive adhesive. The thickness of the adhesive layer is preferably in a range of 1 to 1,000 μm, more preferably in a range of 5 to 500 μm, and most preferably in a range of 10 to 100 μm, in order to provide elasticity.

Meanwhile, the term, "pressure sensitive adhesive", in this invention means an adhesive just like the one applied to an adhesive double coated tape or a rear side of a label to carry out adhesion instantaneously with an extremely slight pressure.

In the case the ultraviolet ray-curable resin is used as the adhesive, the adhesive layer can be formed by applying the ultraviolet ray-curable resin as it is or in form of a coating solution produced by being dissolved in a proper solvent such as methyl ethyl ketone, ethyl acetate or the like to the recording layer, forming a cover layer further thereon, and curing the adhesive by radiating ultraviolet rays through the cover layer.

In order to prevent warp of a disc, the ultraviolet ray-curable resin to be used for the adhesive layer is preferable to have a small curing shrinkage ratio. As such ultraviolet ray-curable resin, the ultraviolet ray-curable resin such as SD-640 manufactured by Dainippon Ink and Chemicals, Incorporated can be exemplified. Further, SD-347 (manufactured by Dainippon Ink and Chemicals, Incorporated), SD-694 (manufactured by Dainippon Ink and Chemicals, Incorporated), SKCD 1051 (manufactured by SKC Co.), and the like are usable.

In the case pressure sensitive adhesive is used as the adhesive, the pressure sensitive adhesive is adjusted to be in a proper size and stuck to the recording layer, the separator or the like is peeled, and then the cover layer is formed.

In the case of using an adhesive double coated tape as an adhesive, the substrate of the adhesive double coated tape is not particularly limited and, for example, those usable are a plastic film such as polyethylene terephthalate, polypropylene, polyethylene, vinyl chloride and the like; paper such as kraft paper, high quality paper, clay-coated paper, Japanese paper, and the like; an unwoven fabric such as rayon, polyesters and the like; a woven fabric made of synthetic fibers such as polyesters, nylon, acrylic fibers and the like; and a metal foil such as aluminum, copper, a stainless steel and the like. From the viewpoint of uniform application of a release agent layer in stripes on the substrate, a plastic film is preferable.

As the release agent to be used for the adhesive double coated tape, a variety of conventionally used release agents such as a silicone-based release agent, a long chain alkyl-based release agent and the like may properly be selected and used.

The adhesive to contribute the adhesion is not at all limited and, for example, an acrylic-based pressure sensitive adhesive, a rubber-based pressure sensitive adhesive such as natural rubber, styrene-isoprene-styrene copolymer (SIS), styrene-butadiene-styrene copolymer (SBS), and the like may properly be selected and used.

[Cover Layer]

The cover layer of the first embodiment of the invention is formed in order to prevent water penetration in the inside of the optical information recording medium and is preferably made of a material having 80% or higher transmissivity of laser beam to be employed for recording and reproducing. Specifically, polycarbonate (Pure Ace, manufactured by Teijin Ltd.; Panlite, manufactured by Teijin Chemical Industry Co., Ltd.), cellulose triacetate (Fujitac, manufactured by Fuji Photo Film Co., Ltd.), PET (Lumirror, manufactured by Toray Industries, Inc.) are preferable and among them, polycarbonate and cellulose triacetate are further preferable.

The cover layer of the first embodiment of the invention has a feature that the center surface average roughness (SRa1) (hereinafter, referred simply as to SRa1 in some cases) is 3.0 nm or lower in the case of measurement in a large surface area and the center surface average roughness (SRa2) (hereinafter, referred simply as to SRa2 in some cases) is 3.0 nm or lower in the case of measurement in a minute surface area and preferably SRa1 is 1.5 nm or lower and SRa2 is 1.5 nm or lower and more preferably SRa1 is 1.0 nm or lower and SRa2 is 1.0 nm or lower.

If the SRa1 exceeds 3.0 nm, the focus margin and tilt margin is narrowed. On the other hand, the SRa2 exceeds 3.0 nm, diffused reflection of light takes place on the medium surface, so that the reflectivity is decreased, the shape of marks to be recorded is deteriorated, and C/N and jitter is lowered.

In the invention, the center surface average roughness (SRa1) in the case of measurement in a large surface area can be measured as follows. That is, using Digital Optical Profiler which is a light interference surface roughness meter: HD-2000 manufactured by WYKO Co.; an objective lens: ×50, an intermediate lens: ×0.5 and under a condition of the measurement range: 242 μm×184 μm, the object surface is measured and the measurement result is subjected to tilt correction and cylindrical correction to obtain basic data, and the center surface average roughness (SRa1: unit; nm) is computed from the basic data.

Whereas, that the center surface average roughness (SRa2) in the case of measurement in a minute surface area means the center surface average roughness measured by an atomic force microscope (AFM) and more specifically, it can be computed from data obtained using SPA 500 manufactured by Seiko Instruments Inc. under conditions of the AFM mode (contact mode), using a measurement probe: SIAF01 (spring constant: 0.1 N/m), in the measurement range of 10 μm square, with the scanning lines: 512×512, and at scanning speed: 2 Hz.

The surface roughness of the cover layer according to the first embodiment of the invention is determined depending on the type of the resin composing the cover layer, the film formation method, the presence or absence and the type of a filler, the surface roughness of the substrate, the formation conditions of the light reflective layer, the type and film formation method of the recording layer, and the type and application conditions of the adhesive layer.

The cover layer is formed by preparing a coating solution by dissolving the photo-curable resin composing the adhesive layer in a proper solvent, applying the coating solution to the recording layer at a predetermined temperature to form a coating film, laminating, for example, a cellulose triacetate film (TAC film) obtained by extrusion processing a plastic, on the coating film, and curing the coating film by radiating light from the upper side of the laminated TAC film. The foregoing TAC film is preferable to contain an ultraviolet ray absorber. The thickness of the cover layer in the first embodiment of the invention is generally in a range from 0.01 to 0.5 mm, preferably in a range of 0.05 to 0.3 mm, and more preferably in a range of 0.08 to 0.12 mm.

In order to control the viscosity, the application temperature is preferably in a range of 23 to 50° C., more preferably in a range of 24 to 40° C., and furthermore preferably in a range of 25 to 37° C.

In order to prevent warp of the disc, the radiation to the coating film is preferable to be carried out using a pulse type light radiating apparatus (preferably an ultraviolet ray radiation apparatus). The pulse intervals are preferably m-sec or shorter, more preferably μ-sec or shorter. The radiation dose per one pulse is not particularly limited but preferably 3 kW/cm$^2$ or lower, more preferably 2 kW/cm$^2$ or lower.

The number of the radiation times is not limited but preferably 20 times or less, more preferably 10 times or less.

<Second Embodiment>

A second embodiment of the optical information recording medium of the invention (hereinafter, referred simply as to the second embodiment) is characterized in that the recording medium comprises a substrate including a groove with a track pitch of 200 to 400 nm and a groove depth of 20 to 150 nm and having successively disposed on a surface thereof a light reflective layer, a recording layer containing a dye in which information is recorded by irradiation with a laser beam having a wavelength of no greater than 450 nm, an adhesive layer containing an adhesive, a cover layer with a thickness of 0.01 to 0.5 mm, and at least one overcoated layer of radiation-curable resin, wherein a surface of the optical information recording medium on a side disposed with the overcoated layer has a center surface average roughness (SRa1) of no greater than 3.0 nm when measured over a large surface area and a center surface average roughness (SRa2) of no greater than 3.0 nm when measured over a minute surface area.

Hereinafter, the substrate, the light reflective layer, the recording layer, the cover layer, and the overcoated layer in the second embodiment will be described.

The substrate, the light reflective layer, and the recording layer in the second embodiment are respectively similar to the substrate, the light reflective layer, and the recording layer in the first embodiment.

Meanwhile the thickness, the material, and the formation method of the cover layer in the second embodiment are respectively similar to the thickness, the material, and the formation method of the cover layer in the first embodiment of the invention. Also, with respect to SRa1, SRa2, as it will be described later, since the surface roughness of the overcoated layer is defined in the second embodiment, they are not particularly limited if they are within ranges in which the surface of the overcoated layer is not affected.

[Overcoated Layer]

In the second embodiment, for a purpose to physically and chemically protect the recording layer and the light reflective layer, at least one overcoated layer is formed on the cover layer. The material to be employed for the overcoated layer in the second embodiment is preferably radiation-curable resin.

The foregoing radiation-curable resin means resin possible to be cured by radiating radiation beam as described later and having two or more radiation functional double bonds in a molecule. Specific examples are acrylate compounds, acrylamides, methacrylate compounds, methacrylic acid amides, vinyl ethers, vinyl esters, and the like; and among them, acrylate compounds and methacrylate compounds having two or more functional groups are preferable.

Usable acrylate compounds and methacrylate compounds having two or more functional groups include the compounds produced by addition of acrylic acid or methacrylic acid with aliphatic diols, such as ethylene glycol diacrylate, propylene glycol diacrylate, butanediol diacrylate, hexanediol diacrylate, diethylene glycol diacrylate, triethylene glycol diacrylate, tetraethylene glycol diacrylate, neopentyl glycol diacrylate, tripropylene glycol diacrylate, ethylene glycol dimethacrylate, propylene glycol dimethacrylate, butanediol dimethacrylate, hexanediol dimethacrylate, diethylene glycol dimethacrylate, triethylene glycol dimethacrylate, tetraethylene glycol dimethacrylate, neopentyl glycol dimethacrylate, and tripropylene glycol dimethacrylate.

Further, polyether acrylates or polyether methacrylates obtained by addition of acrylic acid or methacrylic acid with polyether polyol such as polyethylene glycol, polypropylene glycol, polytetramethylene glycol and the like are also usable and polyester acrylates or polyester methacrylates obtained by addition of acrylic acid or methacrylic acid with polyester polyols obtained by known dibasic acid and glycols are also usable.

Further, polyurethane acrylates or polyurethane methacrylates obtained by addition of acrylic acid or methacrylic acid with polyurethanes obtained by known polyols or diols with polyisocyanate may also be used.

Also usable are those obtained by addition of acrylic acid or methacrylic acid with bisphenol A, bisphenol F, hydrogenated bisphenol A, hydrogenated bisphenol F, and their alkylene oxide adducts and those having a ring structure such as isocyanuric acid alkylene oxide-modified diacrylate, isocyanuric acid alkylene oxide-modified dimethacrylate, tricyclodecanedimethanol diacrylate, tricyclodecanedimethanol dimethacrylate, and the like.

The radiation beam to be used for the invention is preferably electron beam or ultraviolet rays. In the case of using ultraviolet rays, it is required to add a photopolymerization initiator to the compounds.

As the photopolymerization initiator, an aromatic ketone is used. The aromatic ketone is not particularly limited, however, it is preferable to have a relatively high absorbance at wavelength of 254, 313, 365 nm at which bright line spectra of a mercury lamp commonly used as an ultraviolet ray light source are generated. The specific examples of the ketone include acetophenone, benzophenone, benzoin ethyl ether, benzyl methyl ketal, benzyl ethyl ketal, benzoin isobutyl ketone, hydroxdimethyl phenyl ketone, 1-hydroxycyclohexyl phenyl ketone, 2,2-diethoxyacetophenone, Michler's ketone and the like and a variety of aromatic ketones are usable. The mixing ratio of the aromatic ketones is preferably in a range of 0.5 to 20 parts by weight, more preferably in a range of 2 to 15 parts by weight, and more preferably in a range of 3 to 10 parts by weight with respect to 100 parts by weight of the compound. As the ultraviolet ray-curable adhesive, those previously containing a photoinitiator are commercialized and may be used. As the ultraviolet ray light source, a mercury lamp may be employed. A mercury lamp with an output power of 20 to 200 W/cm is used at a speed of 0.3 m/min to 20 m/min. The distance between the substrate and the mercury lamp is generally preferable to be 1 to 30 cm.

As an electron beam accelerator, a scanning manner, a double scanning manner or a curtain beam manner may be used and a preferable manner is the curtain beam manner, which can provide a high output at a relatively low cost. With respect to the preferable electron beam characteristics, the acceleration voltage is preferably 10 to 1,000 kV, more preferably 150 to 300 kV. The absorption dose is preferably 0.5 to 20 Mrad, more preferably 1 to 10 Mrad. In the case the acceleration voltage is lower than 10 kV, the permeation quantity of the energy is deficient in some cases and in the case it is higher than 1,000 kV, the energy efficiency to be used for the polymerization is decreased and economically inferior in some cases.

In the case of using the radiation-curable resin, the resin is applied either as it is without using any solvent or in form of a coating solution prepared by dissolving the resin in a proper solvent and cured by radiating radiation beam to form the layer. The coating solution may further contain various kinds of additives such as an anti-static agent, an antioxidant, a radiation beam absorber and the like according to the purposes.

In the second embodiment, the center surface average roughness SRa1 of the overcoated layer surface is 3.0 nm or lower in the case of measurement in a large surface area and the center surface average roughness SRa2 is 3.0 nm or lower in the case of measurement in an minute surface area; and preferably, SRa1 is 1.5 nm or lower and SRa2 is 1.5 nm or lower and more preferably SRa1 is 1.0 nm or lower and SRa2 is 1.0 nm or lower.

If SRa1 of the overcoated layer surface exceeds 3.0 nm, similarly to the SRa1 of the cover layer of the first embodiment of the invention, the focus margin and the tilt margin are narrowed. On the other hand, SRa2 of the overcoated layer surface exceeds 3.0 nm, similarly to the SRa2 of the cover layer of the first embodiment of the invention, diffused reflection of light takes place on the medium surface to result in decrease of reflectivity and deterioration of the shape of marks to be recorded and consequently lead to C/N and jitter decrease.

<Third Embodiment>

The third embodiment of the optical information recording medium of the invention (hereinafter, referred to as the third embodiment in some cases) is characterized in that the recording medium comprises a substrate including a groove with a track pitch of 200 to 400 nm and a groove depth of 20 to 150 nm and having successively disposed on a surface thereof a light reflective layer, a recording layer on which information is recorded by irradiation with a laser beam having a wavelength of no greater than 450 nm, an adhesive layer containing an adhesive, and a cover layer with a thickness of 0.01 to 0.5 mm, wherein a surface of the cover layer has at least 15 projections with a height of at least 20 nm per 30 μm$^2$ and 1 to 5 of the projections have a height of at least 100 nm. Hereinafter, the respective layers will be described.

In the third embodiment of the invention, the surface of the cover layer may be overcastted with ultraviolet ray-curable resin. In such a case, in this invention, the phrase, "the surface of the cover layer", means the surface of the overcoated layer containing the ultraviolet ray-curable resin overcoating the cover layer.

Accordingly, in the case there are 15 or more of projections with a height of 20 nm or higher per 30 μm$^2$ among which 1 to 5 projections have a height of 100 nm or higher on the surface of the overcoated layer containing the ultraviolet ray-curable resin, the case is included in the invention.

[Substrate]

The substrate to be employed for the third embodiment is similar to the substrate of the first embodiment and the track pitches of pre-grooves formed in the substrate are required to be essentially in a range from 200 to 400 nm and preferably in a range of 280 to 340 nm. The depth of the pre-grooves (the groove depth) is required to be essentially in a range from 20 to 150 nm and preferably in a range of 30 to 80 nm.

For the purpose to improve the smoothness and increase the adhesion strength, it is preferable to form an undercoated layer on the substrate surface in the side where the light reflective layer, which will be described later, will be formed. The foregoing undercoated layer is similar to that described in the first embodiment.

[Light Reflective Layer]

The light reflective layer of the third embodiment is similar to the light reflective layer described in the first embodiment.

[Recording Layer]

The recording layer in the invention is formed on the light reflective layer and preferably contains a dye as a recording substance capable of recording the information by laser beam with wavelength of 450 nm or shorter. The dye to be contained in the recording layer includes a cyanine dye, an oxonol dye, a metal complex-based dye, an azo dye, a phthalocyanine dye, and the like and among them the phthalocyanine dye is preferable.

The dye contained in the recording layer is preferable to have one or more maximum absorption peaks, at least one of which has a maximum absorption wavelength of no greater than 400 nm. Accordingly, that provides an advantage that excellent recording and reproducing can be carried out using laser with wavelength longer than 400 nm.

The dyes described in JP-A Nos. 4-74690, 8-127174, 11-53758, 11-334204, 11-334205, 11-334206, 11-334207, 2000-43423, 2000-108513, 2000-158818 and the like are preferable to be used.

The recording layer can be formed by preparing a coating solution by dissolving a recording substance such as a dye together with a binder or the like in a proper solvent, applying the coating solution to the light reflective layer formed on the substrate surface to form a coating film and then drying the coating film.

The concentration of the recording substance in the coating solution, specific examples of the solvent of the coating solution, the binder, and the application method are similar to those described in the first embodiment.

In order to improve the photoresistance of the recording layer, various anti-decoloration agents may be added to the recording layer. The foregoing anti-decoloration agents are similar to those described in the first embodiment.

[Adhesive Layer]

The adhesive layer of the invention is formed in order to increase the adhesion strength between the above-described recording layer and the cover layer, which will be described later. The adhesive for forming the adhesive layer is preferably ultraviolet ray-curable resin or pressure-sensitive adhesive. The thickness of the adhesive layer is preferably in a range of 1 to 1,000 μm, more preferably in a range of 5 to 500 μm, and furthermore preferably in a range of 10 to 100 μm in order to provide elasticity.

Meanwhile, the term, "pressure-sensitive adhesive", in the invention means an adhesive just like the one applied to an adhesive double coated tape or a rear side of a label to carry out adhesion instantaneously with an extremely slight pressure.

The solubility of the dye contained in the recording layer in the adhesive is preferably not more than 0.1% by weight, more preferably in a range of 0.00001 to 0.01% by weight, of the adhesive composing the adhesive layer. Accordingly, a dye layer (the recording layer) without unevenness can reliably be obtained and fine pits are formed at the time of recording and excellent reproducing can be assured.

As a result, the adhesive is so properly selected and used as to suppress the solubility to less than 0.1% by weight.

The foregoing solubility is preferably measured as described below.

In the case of using the ultraviolet ray-curable resin, the dye composing the recording layer is gradually added to the ultraviolet ray-curable resin before curing and the transmissivity is measured by a spectrophotometer and the solubility is measured from the transmissivity.

Also in the case of using a pressure sensitive adhesive, the adhesive component of the pressure sensitive adhesive is dissolved in a proper solvent if necessary similarly to the case of using the ultraviolet ray-curable resin and the dye composing the recording layer is gradually added and the transmissivity is measured by a spectrophotometer and the solubility is measured from the transmissivity.

In the case of using the ultraviolet ray-curable resin, the adhesive layer can be formed by applying the ultraviolet ray-curable resin as it is or in form of a coating solution prepared by dissolving the ultraviolet ray-curable resin in a proper solvent such as methyl ethyl ketone, ethyl acetate or the like to the recording layer, forming a cover layer, and radiating ultraviolet rays from the upper side of the cover layer to cure the adhesive.

In order to prevent warp of the disc, the ultraviolet ray-curable resin composing the adhesive layer is preferable to have a low curing shrinkage ratio. As such ultraviolet ray-curable resin, for example, SD-640 manufactured by Dainippon Ink and Chemicals, Incorporated can be exemplified. Further, SD-347 (manufactured by Dainippon Ink and Chemicals, Incorporated), SD-694 (manufactured by Dainippon Ink and Chemicals, Incorporated), SKCD 1051 (manufactured by SKC Co.), and the like are usable.

In the case of using the pressure sensitive adhesive as the adhesive, the pressure sensitive adhesive is adjusted to be in a proper size and stuck to the recording layer, the separator or the like is peeled, and then the cover layer is formed.

In the case of using an adhesive double coated tape as the pressure sensitive adhesive, the substrate of the adhesive double coated tape is not particularly limited and, for example, those usable are a plastic film such as polyethylene terephthalate, polypropylene, polyethylene, vinyl chloride and the like; paper such as kraft paper, high quality paper, clay-coated paper, Japanese paper, and the like; an unwoven fabric such as rayon, polyesters and the like; a woven fabric made of synthetic fibers such as polyesters, nylon, acrylic fibers and the like; and a metal foil such as aluminum, copper, a stainless steel and the like. From the viewpoint of uniform application of a release agent layer in stripes on the substrate, a plastic film is preferable.

As the release agent to be used for the adhesive double coated tape, a variety of conventionally used release agents such as a silicone-based release agent, a long chain alkyl-based release agent and the like may properly be selected and used.

The adhesive to contribute the adhesion is not at all limited and, for example, an acrylic-based pressure sensitive adhesive, a rubber-based pressure sensitive adhesive such as natural rubber, styrene-isoprene-styrene copolymer (SIS), styrene-butadiene-styrene copolymer (SBS), and the like may properly be selected and used.

[Cover Layer]

The cover layer of the invention is formed in order to protect the recording layer and to prevent water penetration into the optical information recording medium, and is preferably made of a material having 80% or higher transmissivity of laser beam to be employed for recording and reproducing. Specifically, polycarbonate (Pure Ace, manufactured by Teijin Ltd.; Panlite, manufactured by Teijin Chemical Industry Co., Ltd.), cellulose triacetate (Fujitac, manufactured by Fuji Photo Film Co., Ltd.), PET (Lumirror, manufactured by Toray Industries, Inc.) are preferable and among them, polycarbonate and cellulose triacetate are further preferable.

Further, as described above, in the optical information recording medium of the invention, the surface of the cover layer may be overcoated with the ultraviolet ray-curable resin. In such case in this invention, the phrase, "the surface of the cover layer", means the surface of the overcoated layer containing the ultraviolet ray-curable resin overcoating the cover layer.

Accordingly, in the case the surface of the overcoated layer containing the ultraviolet ray-curable resin has projections as described below, it is included in the invention.

The cover layer of the invention has a feature that 15 or more of projections with a height of 20 nm or higher per 30 $\mu m^2$ in the surface and among projections with a height of 20 nm or higher, 1 to 5 projections have a height of 100 nm or higher per 30 $\mu m^2$: preferably 15 to 100 projections having a height of 20 nm or higher exist per 30 $\mu m^2$ and 1 to 4 projections having a height of 100 nm or higher exist per 30 $\mu m^2$.

If the number of the projections with a height of 20 nm or higher per 30 $\mu m^2$ is less than 15, the surface area of pickups directly contacting the texture is increased and accordingly the disc surface is scratched. Further, the jitter is deteriorated. On the other hand, in the case the number of the projections with a height of 100 nm or higher is 6 or higher per 30 $\mu m^2$, the pickups and the coarse projections come into collision against to each other to abrade each other and the abrasion powder scratches the disc surface and accordingly scratches are formed on the disc surface. Further, in the case the number of the projections with a height of 100 nm or higher per 30 $\mu m^2$ is zero, the surface area of pickups directly contacting the surface is increased and accordingly the disc surface is scratched.

The number of the projections in the cover layer of the invention is determined depending on the type of the resin composing the cover layer, the film formation method, the presence or absence and the type of a filler, the surface roughness of the substrate, the formation conditions of the light reflective layer, the type and film formation method of the recording layer, and the type and application conditions of the adhesive layer. An ultraviolet ray absorber may be added in the cover layer. In such a case, the deterioration of the dye layer can be suppressed even if the optical information recording medium is stored under interior light rays.

The cover layer is formed by preparing a coating solution by dissolving the photo-curable resin composing the adhesive layer in a proper solvent, applying the coating solution to the recording layer at a predetermined temperature to form a coating film, laminating, for example, a cellulose triacetate film (TAC film) obtained by extrusion processing a plastic, on the coating film, and curing the coating film by radiating light from the upper side of the laminated TAC film. The foregoing TAC film is preferable to contain an ultraviolet ray absorber. The thickness of the cover layer in the invention is generally in a range from 0.01 to 0.5 mm, preferably in a range of 0.05 to 0.2 mm, and more preferably in a range of 0.08 to 0.13 mm.

In order to control the viscosity, the application temperature is preferably in a range of 23 to 50° C., more preferably in a range of 24 to 40° C., and furthermore preferably in a range of 25 to 37° C.

In order to prevent warp of the disc, the radiation to the coating film is preferable to be carried out using a pulse type light radiating apparatus (preferably an ultraviolet ray radiation apparatus). The pulse intervals are preferably m-sec or shorter, more preferably μ-sec or shorter. The radiation dose per one pulse is not particularly limited but preferably 3 kW/cm$^2$ or lower, more preferably 2 kW/cm$^2$ or lower.

The number of the radiation times is not limited but preferably 20 times or less, more preferably 10 times or less.

<Fourth Embodiment>

The fourth embodiment of the optical information recording medium of the invention is characterized in that the recording medium comprises a substrate including a land with a track pitch of 200 to 400 nm, a land height of 20 to 100 nm, and a land width of 80 to 220 nm and having successively disposed on a surface thereof at least a light reflective layer, a recording layer containing an organic dye, and a protective layer, wherein the protective layer has a thickness of 75 to 130 μm and recording and reproducing are carried out on the land through the protective layer using a laser beam with a wavelength of no greater than 450 nm and an objective lens with a numerical aperture (NA) of no less than 0.7.

In the preferable embodiment of the invention, the organic dye may be selected from a group consisting of phthalocyanine-based dyes, benzotriazole-based dyes, and aminobutadiene-based dyes.

The fourth embodiment of the optical information recording medium of the invention has a layer structure composed of the substrate in which a specified land is formed, and a light reflective layer, a recording layer containing an organic dye, and a protective layer formed in this order and employed for recording and reproducing through the protective layer. The protective layer is made to have a predetermined thickness.

The fourth embodiment of the optical information recording medium of the invention is for recording in the recording layer on the land part using laser beam with wavelength of 450 nm or shorter and an objective lens with a numerical aperture (NA) of 0.7 or higher.

[Substrate]

In the substrate, a land, specifically, a spiral land, is formed and the track pitches of the land is in a range of 200 o 400 nm, preferably in a range of 260 to 340 nm, the height of the land part is in a range of 20 to 100 nm, preferably in a range of 30 to 80 nm, and the width of the land part is in a range of 80 to 220 nm, preferably in a range of 120 to 180 nm. In the optical information recording medium, the organic dye-containing recording layer is formed on the substrate in which the land specified as described above is formed, so that high density recording excellent in C/N, jitter, and reproduction durability properties can be carried out without any trouble.

In this case, the terms, "track pitches", "the height of the land part", and "the width of the land part", are as follows in observation of a cross-sectional view in the plane vertical to the extension direction of the land as shown in FIG. 1. The distance Tp between the center lines of the neighboring turns of the land stands for "the track pitches": the height Lh from the base part of the land stands for "the height of the land part": and the width Lw at the half-height of the Lh (½ Lh) stands for "the width of the land part".

The material to be employed for the substrate of the fourth embodiment of the optical information recording medium of the invention may be a plastic substrate such as acrylic resin such as polycarbonates, polymethyl methacrylate; vinyl chloride-based resin such as polyvinyl chloride, vinyl chloride copolymers and the like; epoxy resin; amorphous polyolefins; and polyesters, and among them, polycarbonates are preferable to be used.

[Recording Layer]

The recording layer formed in the fourth embodiment of the optical information recording medium of the invention is the organic dye-containing recording layer and as the dye, conventionally known ones can be used without any limits. Specific examples are dyes described in JP-A Nos. 4-74690, 8-127174, 11-53758, 11-334204, 11-334205, 11-334206, 11-334207, 2000-43423, 2000-108513, 2000-158818 and the like or preferably triazole, triazine, cyanine, merocyanine, aminobutadiene, phthalocyanine, cinnamic acid, viologen, azo, oxonol benzoxazole, benzotriazole-based dyes and more preferably phthalocyanine-based dyes, benzotriazole-based dyes, and aminobutadiene-based dyes.

The dye-containing recording layer can be formed by preparing a coating solution by dissolving the dyes and other than the dyes, various additives such as an anti-decoloration agent, a binder, an antioxidant, a UV absorber, a plasticizer, a lubricant and the like in a solvent if necessary, applying the coating solution to the substrate surface to form a coating film and then drying the coating film. Incidentally, at the time of dissolving the dyes, the anti-decoloration agent and the like in the solvent, in order to completely dissolve them, ultrasonic dispersion processing is preferable to be carried out.

The solvent for the coating solution of the dye layer includes esters such as butyl acetate, 2-methoxyethyl acetate and the like; ketones such as methyl ethyl ketone, cyclohexanone, methyl isobutyl ketone and the like; chloro hydrocarbons such as dichloromethane, 1,2-dichloroethane, chloroform and the like; amides such as dimethylformamide; hydrocarbons such as cyclohexane; ethers such as tetrahydrofuran, ethyl ether, dioxane, and the like; alcohols such as ethanol, n-propanol, isopropanol, n-butanol, diacetone alcohol and the like; fluoro solvents such as 2,2,3,3- tetrafluoropropanol and the like; glycol ethers such as ethylene glycol monomethyl ether, ethylene glycol monoethyl ether, propylene glycol monomethyl ether and the like. Taking the solubility of the dyes to be employed into consideration, the above-described solvents may properly be used alone or in combination of two or more of them.

The specific examples of the binder includes, for example, natural organic polymer substances such as gelatin, a cellulose derivative, dextran, rosin, rubber and the like and synthetic organic polymers including hydrocarbon-based resin such as polyethylene, polypropylene, polystyrene, polyisobutylene, and the like; vinyl type resin such as polyvinyl chloride, polyvinylidene chloride, polyvinyl chloride-vinyl acetate copolymer; acrylic resin such as polymethyl acrylate, polymethyl methacrylate; polyvinyl alcohol; polyethylene chloride; epoxy resin; butyral resin; rubber derivatives; and phenol-formaldehyde resin. In the case of using the binder as a material for the dye-containing recording layer, the use amount of the binder is generally in a range of 0.2 to 20 parts by weight, preferably in range of 0.5 to 10 parts by weight, and more preferably in a range of 1 to 5 parts by weight with respect to 100 parts by weight of the dyes.

The concentration of the dyes in the coating solution to be prepared in such a manner is generally in a range of 0.01 to 10% by weight, preferably 0.1 to 5% by weight.

As the coating method, a spraying method, a spin coating method, a dipping method, a roll coating method, a blade coating method, a doctor roll method, a screen printing method, and the like can be exemplified. The spin coating method is preferable to be employed since it can suppress the alteration of the dye film thickness in the circumferences and provide an even film. The recording layer may be a single layer or a multi-layer. The layer thickness of the dye-containing recording layer is generally in a range of 20 to 500 nm, preferably in a range of 50 to 300 nm.

There is no particular problem if the coating temperature of the dye coating solution is in a range of 23 to 50° C., and the temperature is preferably in a range of 24 to 40° C. and more preferably in a range of 25 to 37° C.

[Light Reflective Layer]

The light reflective layer formed in the fourth embodiment of the optical information recording medium of the invention is any reflecting film if the film has a high reflectivity of laser beam, that is, 70% or higher reflectivity. The preferable example is similar to the light reflective layer in the first embodiment.

The light reflective layer can be formed on the dye-containing recording layer by, for example, vacuum evaporation of the light reflecting substances, sputtering them, or ion plating with them. The layer thickness of the light reflective layer is generally in a range of 10 to 800 nm, preferably in a range of 20 to 500 nm, and more preferably in a range of 50 to 300 nm.

[Protective Layer]

The protective layer of the fourth embodiment is preferable to have transmittance of 80% of higher to the laser beam to be employed for recording and reproducing. The foregoing protective layer may be in the following two modes. The first mode is a double-layer structure comprising a cover film formed on the recording layer through the adhesive layer and the second mode is a mono-layer structure formed by forming the curable resin on the recording layer and curing the resin. As the cover film to be employed for the first mode, any resin sheet with the surface roughness of 5 nm or lower may be used without any limits and the material for such a resin sheet includes polycarbonate (Pure Ace, manufactured by Teijin Ltd.; Panlite, manufactured by Teijin Chemical Industry Co., Ltd.), cellulose triacetate (Fujitac, manufactured by Fuji Photo Film Co., Ltd.), PET (Lumirror, manufactured by Toray Industries, Inc.) and among them, polycarbonate and cellulose triacetate are preferable to be employed. The thickness of the cover film is preferably in a range of 5 to 125 μm and more preferably in a range of 50 to 100 μm.

[Adhesive Layer]

In the first mode, the cover film is stuck to the recording layer by an adhesive. The adhesive is selected in consideration of the adhesion strength, the workability, and the like and a radiation beam-curable adhesive is preferable to be used. The radiation beam-curable adhesive includes an electron beam-curable adhesive and an ultraviolet ray-curable adhesive and the latter is preferable due to the superior productivity.

The radiation beam-curable adhesive contains a monomer or resin having two or more radiation functional double bonds in a molecule. Specific examples are acrylic acid esters, acrylamides, methacrylic acid compounds, methacrylic acid amides, allyl compounds, vinyl ethers, vinyl esters, and the like; and among them, acrylate compounds and methacrylate compounds having two or more functional groups are preferable.

Specific examples of the bifunctional (meth)acrylate monomer or resin include the compounds produced by addition of acrylic acid or methacrylic acid with aliphatic diols, such as ethylene glycol diacrylate, propylene glycol diacrylate, butanediol diacrylate, hexanediol diacrylate, diethylene glycol diacrylate, triethylene glycol diacrylate, tetraethylene glycol diacrylate, neopentyl glycol diacrylate, tripropylene glycol diacrylate, ethylene glycol dimethacrylate, propylene glycol dimethacrylate, butanediol dimethacrylate, hexanediol dimethacrylate, diethylene glycol dimethacrylate, triethylene glycol dimethacrylate, tetraethylene glycol dimethacrylate, neopentyl glycol dimethacrylate, and tripropylene glycol dimethacrylate.

Further, polyether acrylates or polyether methacrylates obtained by addition of acrylic acid or methacrylic acid with polyether polyol such as polyethylene glycol, polypropylene glycol, polytetramethylene glycol and the like are also usable and polyester acrylates or polyester methacrylates obtained by addition of acrylic acid or methacrylic acid with polyester polyols obtained by known dibasic acid and glycols are also usable.

Further, polyurethane acrylates or polyurethane methacrylates obtained by addition of acrylic acid or methacrylic acid with polyurethanes obtained by reacting of known polyols with polyisocyanate may also be used.

Also usable are those obtained by addition of acrylic acid or methacrylic acid with bisphenol A, bisphenol F, hydrogenated bisphenol A, hydrogenated bisphenol F, and their alkylene oxide adducts and those having a ring structure such as isocyanuric acid alkylene oxide-modified diacrylate, isocyanuric acid alkylene oxide-modified dimethacrylate, tricyclodecanedimethanol diacrylate, tricyclodecanedimethanol dimethacrylate, and the like.

In the case of using the ultraviolet ray-curable adhesive for the radiation beam-curable adhesive, it is required to add a photopolymerization initiator to the polymerizable monomer and resin and known photopolymerization initiators may be employed and among them, an aromatic ketone is preferable to be used. The aromatic ketone is not particularly limited, however, it is preferable to have a relatively high absorbance at wavelength of 254, 313, and 365 nm at which bright line spectra of a mercury lamp commonly used as an ultraviolet ray light source are generated. The specific examples of the ketone include acetophenone, benzophenone, benzoin ethyl ether, benzyl methyl ketal, benzyl ethyl ketal, benzoin isobutyl ketone, hydroxdimethyl phenyl ketone, 1-hydroxycyclohexyl phenyl ketone, 2,2-diethoxyacetophenone, Michler's ketone and the like and a variety of aromatic ketones are usable.

The mixing ratio of the aromatic ketones is in a range of 0.5 to 20 parts by weight, preferably in a range of 2 to 15 parts by weight, and more preferably in a range of 3 to 10 parts by weight with respect to 100 parts by weight of the polymerizable monomer and resin. As the ultraviolet ray-curable adhesive, those previously containing a photo-initiator are commercialized and may be used. As the ultraviolet ray light source, a mercury lamp may be employed. A mercury lamp with an output power of 20 to 200 W/cm is used at a speed of 0.3 m/min to 20 m/min. The distance between the substrate and the mercury lamp is generally preferable to be 1 to 30 cm.

As an electron beam accelerator to be employed for the electron beam-curable adhesive, a scanning manner, a double scanning manner or a curtain beam manner may be used and a preferable manner is the curtain beam manner, which can provide a high output at a relatively low cost. With respect to the preferable electron beam characteristics, the acceleration voltage is preferably 10 to 1,000 kV, more preferably 150 to 300 kV and the absorption dose is preferably 0.5 to 20 Mrad, more preferably 1 to 10 Mrad.

The coating method of the adhesive to the recording layer is not particularly limited, however a spin coating method is preferable. The thickness of the adhesive layer is preferably in a range of 5 to 130 μm and more preferably in a range of 10 to 40 μm. There is not particular problem if coating temperature of the adhesive is in a range of 23 to 50° C., however it is preferably in a range of 24 to 40° C., more preferably in a range of 25 to 37° C.

As the curable resin to be used in the second mode, the radiation beam-curable adhesives to be used for the first mode may be used. The radiation beam-curable adhesives are applied to the recording layer in a proper thickness to be in a range of 75 to 130 μm after curing and cured to form the protective layer.

[Other Layers]

The fourth embodiment of the optical information recording medium of the invention may further comprise any optional layer if necessary other than the above-described light reflective layer, recording layer, and adhesive layer. Examples are an undercoated layer, a sputtered layer and an auxiliary protective layer.

-Undercoated Layer-

The undercoated layer is preferable to be formed in the substrate surface in the side where the light reflective layer is to be formed for the purpose to improve the smoothness and increase the adhesion strength. The undercoated layer is similar to the undercoated layer as described in the first embodiment.

-Sputtered Layer-

The sputtered layer may be called as a heat resistant protective layer and formed in either or both faces of the recording layer and is preferable to have a high transmittance to laser beam to be employed for recording and reproducing and a function of releasing heat generated excessively in the recording layer to the outside.

The material for the sputtered layer is not particularly limited, however it is preferably a single element or a compound (an oxide, a nitride, or a sulfide) of Si, Zn, Ag, Al, Ti, Sn, W, Cu, Ge, Mn, Sb, and Zr and preferably a single element or a compound of Si, Zn, Ag, Al, Ti, Sn, and Ge. These materials may properly be selected and used in consideration of various physical properties such as the melting point, the rigidity and the like and therefore they may be used alone or in combination of two or more of them.

-Auxiliary Protective Layer-

The optical information recording medium of the invention may comprise an auxiliary protective layer on the protective layer. The foregoing auxiliary protective layer may be formed using the ultraviolet ray-curable resin. The auxiliary protective layer may be formed by, for example, applying the ultraviolet ray-curable resin to the surface of the cover film by spin coating, and then, curing the ultraviolet ray-curable resin by radiating ultraviolet rays from an ultraviolet radiation lamp.

(Recording Method and Reproducing Method of Information Using Optical Information Recording Medium)

Next, the recording method information in the optical information recording medium of the invention and reproducing method of recorded information will be described below.

Recording the information in the optical information recording medium, for example, is carried out as follows.

At first, while the optical information recording medium being turned at a constant linear velocity or a constant angular velocity, laser beam for recording is radiated from the cover layer side. By the laser radiation, the recording layer absorbs the light beams and is locally heated to cause physical or chemical changes (for examples, formation of pits) and accordingly change the optical properties to record the information.

The laser beam source having the oscillation wavelength of 450 nm or shorter (preferably 390 to 415 nm) includes a violet semiconductor laser having the emission wavelength in a range of 400 to 410 nm, a blue-green color semiconductor laser having the central emission wavelength of 405 nm, a violet SHG laser with the central emission wavelength of 420 nm and composed of an infrared ray semiconductor laser having the central emission wavelength 660 nm and an optical waveguide type second harmonic generation element (SHG), and the like. In order to increase the recording density, the violet semiconductor laser or the SHG laser capable of providing laser with shorter wavelength is particularly preferable to be employed. Also, in order to increase the recording density, the NA of the objective lens to be used for the pickup is preferably 0.7 or higher, more preferably 0.85 or higher.

Meanwhile, reproducing of the recorded information is carried out by radiating laser beam from the cover layer side and detecting the reflected light rays while rotating the optical information recording medium at the same constant linear velocity as described above.

Although the description is given while exemplifying the optical information recording medium comprising the recording layer containing the organic compounds such as dyes as the recording substances, the recording layer may be a phase change type recording layer for carrying out recording by phase change or a magneto optic recording layer for carrying out recording by magneto optic manner. For example, in the case of using the phase change recording layer, a dielectric layer is made of $ZnS-SiO_2$ or the like and the dielectric layer is formed in place of the light transmissive layer. Further, for the phase change recording layer, a metal compound such as chalcogenides of Sb, Te, Ag, In, and the like may be used.

EXAMPLES

The invention will be described more specifically with reference to examples below, however the invention is not at all limited to these examples.

Example 1 to 7 and Comparative Example 1 to 5

-Measurement and Evaluation of the Center Surface Average Roughness SRa1 and SRa2, C/N, Jitter, and Tilt Margin- Example 1

Using a substrate made of extrusion molded polycarbonate resin (trade name: Panlite AD 5503, polycarbonate manufactured by Teijin Limited) and having a thickness of 1.1 mm and a spiral groove with a diameter of 120 mm (the depth 100 nm; the width 0.120 μm, and the track pitches 300 nm), Ag was sputtered on the face of the substrate having the groove to form a light reflective layer with a film thickness of 100 nm, and after that, a dye coating solution produced by dissolving an Orasol Blue GN (manufactured by Ciba Speciality Chemical Co.; the maximum absorption wavelength: 340 nm) as a dye A in 2,2,3,3-tetrafluoropropanol by mixing them by ultrasonic wave vibration for 2 hours was applied to the resulting substrate by a spin coating method while the rotation speed being changed from 300 rpm to 4,000 rpm under the conditions of 23° C. and 50% RH. After that, the substrate was kept at 23° C. and 50% RH for 1 hour and further an ultraviolet ray-curable adhesive (SD-347, manufactured by Dainippon Ink and Chemicals, Incorporated; the solubility of the dye 0.05% by weight) was applied by a spin coating method at 100 to 300 rpm and as a sheet for the cover layer, a polycarbonate sheet A (SRa1: 2.5 nm, SRa2: 1.0 nm, and the thickness: 0.07 mm) was laminated thereon, and after the ultraviolet ray-curable adhesive was spread to the entire surface by changing the rotation speed from 300 rpm to 4,000 rpm, ultraviolet rays were radiated from an ultraviolet lamp to cure the adhesive and obtain a sample (optical information recording medium).

-Evaluation-

The foregoing produced optical information recording medium was subjected to the following evaluation. The results were shown in Table 1.

<SRa1, SRa2>

The SRa1, SRa2 of the cover layer surface, which was the surface of the produced optical information recording medium were measured by the following methods. The results were shown in Table 1.

Incidentally, in the case of Example 5 and Comparative Example 5, which will be described later, comprising the protective layer, the SRa1, SRa2 of the overcoated layer surface, which was the surface of similarly produced each optical information recording medium were measured and shown in Table 1.

<SRa1>
Apparatus: HD-2000 model manufactured by WYKO Co.
Objective lens: ×50, an intermediate lens: ×0.5
Measurement range: 242 μm×184 μm
SRa1 was measured after the measurement result was subjected to tilt correction and cylindrical correction.

<SRa2>
Apparatus: SPA 500 manufactured by Seiko Instruments Inc.
Mode: AFM mode (contact mode)
Probe for measurement: SI AF01 (spring constant: 0.1 N/m)
Measurement range: 10 μm square
Scanning lines: 512×512
Scanning speed: 2 Hz <C/N>
Using each produced optical information recording medium, signals of a single frequency (2T=0.13 μm) were recorded and regenerated by employing a recording and reproducing evaluation apparatus (DDU1000, manufactured by Pulstec Industrial Co., Ltd.) incorporated with laser of 405 nm and pickup with NA of 0.85 in the conditions of clock frequency of 66 MHz/(linear velocity of 5.6 m/s) and C/N was measured by a spectral analyzer and evaluated according to the following standards:
◯: 48 dB or higher
Δ: not lower than 40 dB and lower than 48 dB
x: lower than 40 dB <Jitter>
Using each produced optical information recording medium, 1–7 PP modulated signals were recorded and regenerated by employing a recording and reproducing evaluation apparatus (DDU1000, manufactured by Pulstec Industrial Co., Ltd.) incorporated with laser of 405 nm and pickup with NA of 0.85 in the conditions of clock frequency of 66 MHz/(linear velocity of 5.6 m/s) and jitter was measured by a time interval analyzer and evaluated according to the following standards:
◯: less than 9%
Δ: 9% or higher and less than 11%
x: 11% or higher <Tilt Margin>
At the time of the above-described jitter measurement, in the case the angle between the laser beam and each optical information recording medium at which the jitter becomes the optimum was set to be 0 deg and angle formed by tilting each recording medium disc at which the jitter was within 10% was defined as the tilt margin and the evaluation was carried out according to the following standards:
◯: in a range of −3 deg. or less or +3 deg. or higher
Δ: in a range from higher than −3 deg. and not higher than −2 deg. or not less than +2 higher and less than +3 deg.
x: in a range of −2 deg. or higher or +2 deg. or less Example 2

An optical information recording medium was produced in the same manner as Example 1 except that a polycarbonate sheet B (SRa1: 2.5 nm, SRa2: 1.0 nm, and the thickness: 0.07 mm) was used in place of the polycarbonate sheet A used in Example 1 and the same measurement and evaluation were carried out. The results were shown in Table 1.

Example 3

An optical information recording medium was produced in the same manner as Example 1 except that a polycarbonate sheet C (SRa1: 1.0 nm, SRa2: 2.2 nm, and the thickness: 0.07 mm) was used in place of the polycarbonate sheet A used in Example 1 and the same measurement and evaluation were carried out. The results were shown in Table 1.

Example 4

An optical information recording medium was produced in the same manner as Example 1 except that a cellulose triacetate sheet A (SRa1: 1.0 nm, SRa2: 2.2 nm, and the thickness: 0.07 mm) was used in place of the polycarbonate sheet A used in Example 1 and the same measurement and evaluation were carried out. The results were shown in Table 1.

Example 5

An optical information recording medium was produced by forming an overcoated layer (SRa1: 1.2 nm and SRa2: 1.5 nm) on the cover layer of the optical information recording medium of Example 1 by applying an ultraviolet ray-curable adhesive (SD-347, manufactured by Dainippon Ink and Chemicals, Incorporated) by a spin coating method at 100 to 300 rpm, spreading the adhesive to the entire surface by changing the rotation speed from 300 rpm to 4,000 rpm, and then radiating ultraviolet rays from an ultraviolet lamp to cure the adhesive. The same measurement and evaluation as those of Example 1 were carried out. The results were shown in Table 1. As described above, SRa1 and SRa2 were the measured values of the overcoated layer surface.

Example 6

An optical information recording medium was produced in the same manner as Example 1 except that an aminobutadiene-based dye B (the maximum absorption wavelength: 360 nm) was used in place of the dye A used in Example 1 and the same measurement and evaluation were carried out. The results were shown in Table 1.

Example 7

An optical information recording medium was produced in the same manner as Example 1 except that a benzotriazol-based dye C (the maximum absorption wavelength: 360 nm) was used in place of the dye A used in Example 1 and the same measurement and evaluation were carried out. The results were shown in Table 1.

Comparative Example 1

An optical information recording medium was produced in the same manner as Example 1 except that a polycarbonate sheet a (SRa1: 5.0 nm, SRa2: 2.0 nm, and the thickness: 0.07 mm) was used in place of the polycarbonate sheet A used in Example 1 and the same measurement and evaluation were carried out. The results were shown in Table 1.

Comparative Example 2

An optical information recording medium was produced in the same manner as Example 1 except that a polycarbonate sheet b (SRa1: 10.0 nm, SRa2: 2.1 nm, and the thickness: 0.07 mm) was used in place of the polycarbonate sheet A used in Example 1 and the same measurement and evaluation were carried out. The results were shown in Table 1.

Comparative Example 3

An optical information recording medium was produced in the same manner as Example 1 except that a polycarbonate sheet c (SRa1: 2.0 nm, SRa2: 5.0 nm, and the thickness: 0.07 mm) was used in place of the polycarbonate sheet A used in Example 1 and the same measurement and evaluation were carried out. The results were shown in Table 1.

Comparative Example 4

An optical information recording medium was produced in the same manner as Example 1 except that a polycarbonate sheet d (SRa1: 5.0 nm, SRa2: 7.0 nm, and the thickness: 0.07 mm) was used in place of the polycarbonate sheet A used in Example 1 and the same measurement and evaluation were carried out. The results were shown in Table 1.

Comparative Example 5

An optical information recording medium was produced by forming an overcoated layer (SRa1: 6.0 nm and SRa2: 2.2 nm) on the cover layer of the optical information recording medium of Comparative Example 1 by applying an ultraviolet ray-curable adhesive (SD-347, manufactured by Dainippon Ink and Chemicals, Incorporated) by a spin coating method at 100 to 300 rpm, spreading the adhesive to the entire surface by changing the rotation speed from 300 rpm to 4,000 rpm, and then radiating ultraviolet rays from an ultraviolet lamp to cure the adhesive. The same measurement and evaluation as those of Example 1 were carried out. The results were shown in Table 1. As described above, SRa1 and SRa2 were the measured values of the overcoated layer surface.

TABLE 1

| | Sheet name | Overcoated layer | Recording layer | Surface roughness SRa1(nm) | SRa2(nm) | C/N | Jitter | Tilt margin |
|---|---|---|---|---|---|---|---|---|
| Example 1 | polycarbonate A | absence | dye A | 0.9 | 1.0 | 55 dB○ | 8%○ | +−5 deg.○ |
| Example 2 | polycarbonate B | absence | dye A | 2.5 | 1.0 | 51 dB○ | 8.2%○ | +−2 deg.Δ |
| Example 3 | polycarbonate C | absence | dye A | 1.0 | 2.2 | 49 dB○ | 8.9%○ | +−4.5 deg.○ |
| Example 4 | cellulose triacetate A | absence | dye A | 1.5 | 2.5 | 48 dB○ | 8.9%○ | +−3 deg.○ |
| Example 5 | polycarbonate A | presence | dye A | 1.2 | 1.5 | 50 dB○ | 8.5%○ | +−4.5 deg.○ |
| Example 6 | polycarbonate A | absence | dye B | 0.9 | 1.0 | 50 dB○ | 8.5%○ | +−5 deg.○ |
| Example 7 | polycarbonate A | absence | dye C | 0.9 | 1.0 | 48 dB○ | 8.5%○ | +−5 deg.○ |
| Comparative Example 1 | polycarbonate a | absence | dye A | 5.0 | 2.0 | 49 dB○ | 8.5%○ | +−1 deg. ≧ X |
| Comparative Example 2 | polycarbonate b | absence | dye A | 10.0 | 2.1 | 45 dBΔ | 8.9%○ | +−1 deg. ≧ X |
| Comparative Example 3 | polycarbonate c | absence | dye A | 2.0 | 5.0 | 35 dBX | 11%X | +−3 deg.○ |

TABLE 1-continued

|  | Sheet name | Overcoated layer | Recording layer | Surface roughness | | Evaluation results | | |
| --- | --- | --- | --- | --- | --- | --- | --- | --- |
|  |  |  |  | SRa1(nm) | SRa2(nm) | C/N | Jitter | Tilt margin |
| Comparative Example 4 | polycarbonate d | absence | dye A | 5.0 | 7.0 | 30 dBX | 11%X | +−1 deg. ≧ X |
| Comparative Example 5 | polycarbonate a | presence | dye A | 6.0 | 2.0 | 49 dB○ | 8.5%○ | +−1 deg. ≧ X |

Table 1 shows that all of the C/N, jitter, and tilt margin were made preferable by limiting SRa1 and SRa2 to 3.0 nm or less.

On the other hand, in the case of Comparative Example 1, 2, 4, and 5 where SRa1 exceeds 3.0, the tilt margin was found out undesirable. Also in the case of Comparative Example 3 and 4 where SRa2 exceeds 3.0, the C/N and jitter were found out undesirable.

Example 8 to 10 and Comparative Example 6 to 9

-Measurement of Specified Projections on the Cover Layer Surface and Evaluation of the Increase of Jitter and Scratches on the Disc Surface- Example 8

Using a substrate made of extrusion molded polycarbonate resin (trade name: Panlite AD 5503, polycarbonate manufactured by Teijin Chemical Industry Co., Ltd.) and having a thickness of 1.1 mm and a spiral groove with a diameter of 120 mm (the depth 100 nm; the width 0.120 μm, and the track pitches 300 nm), Ag was sputtered on the face of the substrate having the groove to form a light reflective layer with a film thickness of 100 nm, and after that, a dye coating solution produced by dissolving an Orasol Blue GN (manufactured by Ciba Speciality Chemical Co.; the maximum absorption wavelength: 340 nm) as a dye A in 2,2,3,3-tetrafluoropropanol by mixing them by ultrasonic wave vibration for 2 hours was applied to the resulting substrate by a spin coating method while the rotation speed being changed from 300 rpm to 4,000 rpm under the conditions of 23° C. and 50% RH. After that, the substrate was kept at 23° C. and 50% RH for 1 hour and further an ultraviolet ray-curable adhesive (SD-347, manufactured by Dainippon Ink and Chemicals, Incorporated; the solubility of the dye 0.05% by weight) was applied by a spin coating method at 100 to 300 rpm and as a sheet for the cover layer, a cellulose triacetate film B (Fujitac, manufactured by Fuji Photo Film Co., Ltd.) with a film thickness of 80 μm and adjusted so as to have the projection in number shown in Table 2 was laminated thereon, and after the ultraviolet ray-curable adhesive was spread to the entire surface by changing the rotation speed from 300 rpm to 4,000 rpm, ultraviolet rays were radiated from an ultraviolet lamp to cure the adhesive and obtain a sample (optical information recording medium)

Incidentally, the number of the projections with a height of 20 nm or higher and the number of the projections with a height of 100 nm or higher per 30 μm² square in the cover layer surface of the above-described sample (optical information recording medium) were measured by an atomic force microscope (AFM) and the details were as follows:

-Measurement-
Apparatus: SPA 500 manufactured by Seiko Instruments Inc.
Mode: AFM mode (contact mode)
Probe for measurement: SI AF01 (spring constant: 0.1 N/m)
Measurement range: 10 μm square
Scanning lines: 512×512
Scanning speed: 2 Hz -Evaluation-
The foregoing produced optical information recording medium was subjected to reproduction repeated 1,000 times using a reproducing evaluation apparatus (DDU1000, manufactured by Pulstec Industrial Co., Ltd.) incorporated with laser of 405 nm wavelength and pickup with NA of 0.85. The increase of the jitter was measured and the scratches on the disc surface were observed by eye observation at that time. The results were shown in Table 2.

Example 9

An optical information recording medium was produced in the same manner as Example 8 except that a cellulose triacetate film C produced by forming a mat layer containing silica as a mat agent and cellulose triacetate as a binder on cellulose triacetate C (Fujitac, manufactured by Fuji Photo Film Co., Ltd.) and adjusted so as to have the projections in number as shown in Table 2 was used in place of the cellulose triacetate film B used in Example 8 and the same measurement and evaluation were carried out. The results were shown in Table 2.

Example 10

An optical information recording medium was produced by forming an overcoated layer adjusted so as to have the projections in number as shown in Table 2 on the cover layer of Example 8 by applying an ultraviolet ray-curable adhesive (SD-347, manufactured by Dainippon Ink and Chemicals, Incorporated) by a spin coating method at 100 to 300 rpm, spreading the adhesive to the entire surface by changing the rotation speed from 300 rpm to 4,000 rpm, and then radiating ultraviolet rays from an ultraviolet lamp to cure the adhesive and the same measurement and evaluation were carried out. The results were shown in Table 2.

Comparative Example 6

An optical information recording medium was produced in the same manner as Example 8 except that a cellulose triacetate film D (the same one as the cover layer used in Example 9 except that no mat layer was formed) adjusted so as to have the projections in number as shown in Table 2 was used in place of the cellulose triacetate film B used in Example 8 and the same measurement and evaluation were carried out. The results were shown in Table 2.

Comparative Example 7

An optical information recording medium was produced in the same manner as Example 8 except that a 80 μm-thick polycarbonate film (trade name: Panlite PC 2151, manufactured by Teijin Chemical Industry Co., Ltd.) adjusted so as to have the projections in number as shown in Table 2 was used in place of the cellulose triacetate film B used in Example 8 and the same measurement and evaluation were carried out. The results were shown in Table 2.

Comparative Example 8

An optical information recording medium was produced by forming an overcoated layer adjusted so as to have the projections in number as shown in Table 2 on the cover layer of Example 8 by applying an ultraviolet ray-curable adhesive (SD-347, manufactured by Dainippon Ink and Chemicals, Incorporated) by a spin coating method at 100 to 300 rpm, spreading the adhesive to the entire surface by changing the rotation speed from 300 rpm to 4,000 rpm, and then radiating ultraviolet rays from an ultraviolet lamp to cure the adhesive and the same measurement and evaluation were carried out. The results were shown in Table 2.

TABLE 2

| | Number of projections with 20 nm height or higher per 30 μm$^2$ | Number of projections with 100 nm height or higher per 30 μm$^2$ | Jitter after reproduction 1,000 times | Scratches |
|---|---|---|---|---|
| Example 8 | 21 | 1 | 8.5% (at beginning, 8.4%) | absennce |
| Example 9 | 78 | 3 | 8.8% (at beginning, 8.5%) | absennce |
| Example 10 | 19 | 1 | 8.2% (at beginning, 8.4%) | absennce |
| Comparative Example 6 | 69 | 0 | 11.2% | presence |
| Comparative Example 7 | 12 | 8 | 17.1% | presence |
| Comparative Example 8 | 8 | 0 | 15.4% | presence |

Table 2 shows that in the case of Example having the projections in a predetermined number was found excellent in the jitter property after reproduction 1,000 times and hardly scratched.

Example 11 to 19 and Comparative Example 9 to 17

-Measurement and Evaluation of the Jitter, C/N, and Reproduction Durability-

Example 11

Using a substrate made of extrusion molded polycarbonate resin (trade name: Panlite AD 5503, polycarbonate manufactured by Teijin Chemical Industry Co., Ltd.) and having a thickness of 1.1 mm and a spiral groove with a diameter of 120 mm (the depth 100 nm; the width 0.120 μm, and the track pitches 300 nm), Ag was sputtered on the face of the substrate having the groove to form a light reflective layer with a film thickness of 100 nm.

After that, a dye coating solution was produced by dissolving a dye A, a phthalocyanine-based organic compound, (Orasol Blue GN: manufactured by Ciba Speciality Chemical Co.; the maximum absorption wavelength: 340 nm, 640 nm) in 2,2,3,3-tetrafluoropropanol by mixing them by ultrasonic wave vibration for 2 hours and the produced coating solution was applied to the reflecting layer by a spin coating method while the rotation speed being changed from 300 rpm to 4,000 rpm under the conditions of 23° C. and 50% RH. After that, the substrate was kept at 23° C. and 50% RH for 1 to 4 hours to dry and form a recording layer (thickness: 100 nm).

After that, an ultraviolet ray-curable adhesive (SD-347, manufactured by Dainippon Ink and Chemicals, Incorporated; the solubility of the dye 0.05% by weight) was applied to the recording layer by a spin coating method at 100 to 300 rpm and a polycarbonate sheet (the thickness: 0.07 mm, trade name: Pure Ace, manufactured by Teijin Ltd.) was laminated thereon, and after the ultraviolet ray-curable adhesive was spread to the entire surface by changing the rotation speed from 300 rpm to 4,000 rpm, ultraviolet rays were radiated from an ultraviolet lamp to cure the adhesive so as to form a protective layer and thus a sample (optical information recording medium) was produced.

Recording and reproducing was carried out in the land part (the convex part observed from the protective layer side).

Example 12

A sample of optical information recording medium of Example 12 was produced in the same manner as Example 11, except that the height of the land part of the substrate was 20 nm instead of 60 nm in the Example 11.

Example 13

A sample of optical information recording medium of Example 13 was produced in the same manner as Example 11, except that the height of the land part of the substrate was 100 nm instead of 60 nm in the Example 11.

Example 14

A sample of optical information recording medium of Example 14 was produced in the same manner as Example 11, except that the width of the land part of the substrate was 220 nm instead of 120 nm in the Example 11.

Example 15

A sample of optical information recording medium of Example 15 was produced in the same manner as Example 11, except that the width of the land part of the substrate was 80 nm instead of 120 nm in the Example 11.

Example 16

A sample of optical information recording medium of Example 16 was produced in the same manner as Example 11, except that the dropwise titrating amount of the ultraviolet ray-curable adhesive and the rotation pattern of the spin coating were changed so as to adjust the thickness of the ultraviolet ray-curable adhesive layer to be 50 μm instead of 30 μm in the Example 11.

Example 17

A sample of optical information recording medium of Example 17 was produced in the same manner as Example 11, except that the dropwise titrating amount of the ultraviolet ray-curable adhesive and the rotation pattern of the spin coating were changed so as to adjust the thickness of the ultraviolet ray-curable adhesive layer to be 5 μm instead of 30 μm in the Example 11.

Example 18

A sample of optical information recording medium of Example 18 was produced in the same manner as Example 11, except that a benzotriazol-based dye (dye D) defined as follows was used as the dye instead of the dye A in the Example 11.

Dye D:

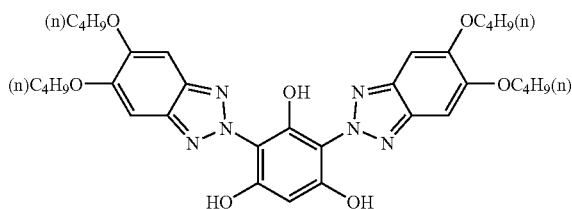

Example 19

A sample of optical information recording medium of Example 19 was produced in the same manner as Example 11, except that an aminobutadiene-based dye (dye E) defined as follows was used as the dye instead of the dye A in the Example 11.

Dye E:

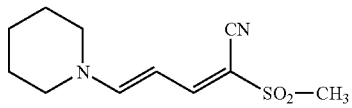

Comparative Example 9

Recording and reproducing was carried out in the same manner as Example 11, except that the recording and reproducing was carried out in the groove part (the groove part observed from the protective layer side).

Comparative Example 10

A sample of optical information recording medium of Comparative Example 10 was produced in the same manner as Example 11, except that the height of the land part of the substrate was 120 nm instead of 60 nm in the Example 11.

Comparative Example 11

A sample of optical information recording medium of Comparative Example 11 was produced in the same manner as Example 11, except that the height of the land part of the substrate was 10 nm instead of 60 nm in the Example 11.

Comparative Example 12

A sample of optical information recording medium of Comparative Example 12 was produced in the same manner as Example 11, except that the width of the land part of the substrate was 240 nm instead of 120 nm in the Example 11.

Comparative Example 13

A sample of optical information recording medium of Comparative Example 13 was produced in the same manner as Example 11, except that the width of the land part of the substrate was 60 nm instead of 120 nm in the Example 11.

Comparative Example 14

A sample of optical information recording medium of Comparative Example 14 was produced in the same manner as Example 11, except that the thickness of the ultraviolet ray-curable adhesive layer was adjusted to be 80 μm instead of 30 μm in the Example 11.

Comparative Example 15

A sample of optical information recording medium of Comparative Example 15 was produced in the same manner as Example 11, except that the thickness of the ultraviolet ray-curable adhesive layer was adjusted to be 3 μm instead of 30 μm in the Example 11.

Comparative Example 16

Using a substrate made of extrusion molded polycarbonate resin (trade name: Panlite AD 5503, polycarbonate manufactured by Teijin Chemical Industry Co., Ltd.) and having a thickness of 1.1 mm and a spiral groove with a diameter of 120 mm (the depth 100 nm; the width 0.120 μm, and the track pitches 300 nm), a light reflective layer (Ag: thickness of 100 nm), an under part heat resistant protective layer (ZnS—$SiO_2$: thickness of 170 nm), a recording layer (AgInSbTe; thickness of 25 nm), and an upper part heat resistant protective layer (ZnS—$SiO_2$: thickness of 35 nm) were formed in this order by a sputtering method.

After that, an ultraviolet ray-curable adhesive (SD-347, manufactured by Dainippon Ink and Chemicals, Incorporated; the solubility in the organic compounds 0.05% by weight) was applied to the upper part heat resistant protective layer by a spin coating method at 100 to 300 rpm and a polycarbonate sheet (the thickness: 0.07 mm, trade name: Pure Ace, manufactured by Teijin Ltd.) was laminated thereon, and after the ultraviolet ray-curable adhesive was spread to the entire surface by changing the rotation speed from 300 rpm to 4,000 rpm, ultraviolet rays were radiated from an ultraviolet lamp to cure the adhesive and produce a sample (optical information recording medium) was produced.

Recording and reproducing was carried out in the groove part (the concave part observed from the protective layer side).

Comparative Example 17

Using the sample employed in Comparative Example 16, recording and reproducing was carried out in the land part.

-Recording Property Evaluation of the Optical Information Recording Medium- (1) Jitter Evaluation Using each produced optical information recording medium, 1–7 PP modulated signals (laser power 6 mW) were recorded and regenerated by employing a recording and reproducing evaluation apparatus (DDU1000, manufactured by Pulstec Industrial Co., Ltd.) incorporated with laser of 405 nm and pickup with NA of 0.85 in the conditions of clock frequency of 66 MHz/(linear velocity of 5.6 m/s) and jitter was measured by a time interval analyzer.

(2) C/N (Carrier vs. Noise Ratio) Evaluation

Using each produced optical information recording medium, single frequency signals (2T=0.13 μm) were recorded and regenerated by employing a recording and reproducing evaluation apparatus (DDU1000, manufactured by Pulstec Industrial Co., Ltd.) incorporated with laser of 405 nm and pickup with NA of 0.85 in the conditions of clock frequency of 66 MHz/(linear velocity of 5.6 m/s) and the C/N was measured by a spectral analyzer.

(3) Regeneration Durability Evaluation

Using each produced optical information recording medium, 1–7 PP modulated signals (laser power 6 mW) were recorded by employing a recording and reproducing evaluation apparatus (DDU1000, manufactured by Pulstec Industrial Co., Ltd.) incorporated with laser of 405 nm and pickup with NA of 0.85 in the conditions of clock frequency of 66 MHz/(linear velocity of 5.6 m/s) and regenerated (laser power 0.4 mW) 1,000,000 times in the still mode and the modulation deterioration after the 1,000,000 times reproducing was measured on the basis of 100% as the modulation factor at the beginning.

The evaluation results were shown in Table 3.

According to Table 3, the jitter, C/N, and reproduction durability of each optical information recording medium of Example were found excellent, whereas the jitter, C/N, and reproduction durability of each optical information recording medium of Comparative Example were found inferior.

The invention can provide an optical information recording medium excellent in high density recording properties, further an optical information recording medium with excellent jitter and improved scratch-proofing property of the disc surface, and furthermore an excellent optical information recording medium comprising an organic dye-containing recording layer and scarcely causing reproduction deterioration, RF output decrease, C/N decrease, and jitter decrease in DVR-Blue system.

What is claimed is:

1. An optical information recording medium comprising: a substrate including a groove with a track pitch of 200 to 400 nm and a groove depth of 20 to 150 nm and having successively disposed on a surface thereof a light reflective layer, a recording layer containing a dye in which information is recorded by irradiation with a laser beam having a wavelength of no greater than 450 nm, adhesive layer, and a cover layer with a thickness of 0.01 to 0.5 mm, at least one overcoated layer, containing a radiation-curable resin, disposed on the cover layer, wherein a surface of the optical information recording medium on a side disposed with the cover layer has a center surface average roughness (SRa1) of no greater than 3.0 nm when measured over a large surface area and a center surface average roughness (SRa2) of no greater than 3.0 nm when measured over a minute surface area.

TABLE 3

| | | Land part | | Adhesive layer | Protective layer | Recording | Jitter | C/N | Reproduction |
| | Recording layer | height(nm) | width(nm) | thickness(μm) | thickness(μm) | position | (%) | (dB) | durability(%) |
|---|---|---|---|---|---|---|---|---|---|
| Example 11 | dye A (phthalocyanine-based) | 60 | 120 | 30 | 100 | land | 8.1 | 54 | 99 |
| Example 12 | dye A (phthalocyanine-based) | 20 | 120 | 30 | 100 | land | 8.9 | 50 | 99 |
| Example 13 | dye A (phthalocyanine-based) | 100 | 120 | 30 | 100 | land | 8.9 | 51 | 95 |
| Example 14 | dye A (phthalocyanine-based) | 60 | 220 | 30 | 100 | land | 8.9 | 50 | 95 |
| Example 15 | dye A (phthalocyanine-based) | 60 | 80 | 30 | 100 | land | 8.5 | 51 | 96 |
| Example 16 | dye A (phthalocyanine-based) | 60 | 120 | 50 | 130 | land | 8.9 | 51 | 92 |
| Example 17 | dye A (phthalocyanine-based) | 20 | 120 | 5 | 75 | land | 8.1 | 51 | 93 |
| Example 18 | dye D (benzotriazol-based) | 60 | 120 | 30 | 100 | land | 8.9 | 55 | 98 |
| Example 19 | dye E (aminobutadiene-based) | 60 | 120 | 30 | 100 | land | 8.9 | 50 | 93 |
| Comparative Example 9 | dye A (phthalocyanine-based) | 60 | 120 | 30 | 100 | grove | 10.5 | 45 | 95 |
| Comparative Example 10 | dye A (phthalocyanine-based) | 120 | 120 | 30 | 100 | land | 11.0 | 40 | 85 |
| Comparative Example 11 | dye A (phthalocyanine-based) | 10 | 120 | 30 | 100 | land | 15.0 | 38 | 80 |
| Comparative Example 12 | dye A (phthalocyanine-based) | 60 | 240 | 30 | 100 | land | 13.0 | 40 | 60 |
| Comparative Example 13 | dye A (phthalocyanine-based) | 60 | 60 | 30 | 100 | land | 12.0 | 38 | 80 |
| Comparative Example 14 | dye A (phthalocyanine-based) | 60 | 120 | 80 | 150 | land | 10.0 | 40 | 70 |
| Comparative Example 15 | dye A (phthalocyanine-based) | 60 | 120 | 3 | 73 | land | 11.0 | 45 | 80 |
| Comparative Example 16 | phase change film (AgInSbTe) | 40 | 120 | 30 | 100 | grove | 8.9 | 50 | 59 |
| Comparative Example 17 | phase change film (AgInSbTe) | 40 | 120 | 30 | 100 | land | 8.8 | 51 | 55 |

2. The optical information recording medium of claim 1, wherein the substrate contains at least one substance selected from the group consisting of glass, polycarbonate, acrylic resin, polyvinyl chloride, vinyl chloride-based resin, epoxy resin, amorphous polyolefin, polyester, and aluminum.

3. The optical information recording medium of claim 1, further comprising an undercoated layer disposed on the substrate surface of the side disposed with the light reflective layer.

4. The optical information recording medium of claim 1, wherein the light reflective layer contains at least one light reflecting substance selected from the group consisting of Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, Bi and stainless steel.

5. The optical information recording medium of claim 1, wherein the dye contained in the recording layer has one or more maximum absorption peaks, at least one of which has a maximum absorption wavelength of no greater than 400 nm.

6. The optical information recording medium of claim 1, wherein the dye contained in the recording layer is selected from the group consisting of a cyanine dye, an oxonol dye, a metal complex-based dye, an azo dye, and a phthalocyanine dye.

7. The optical information recording medium of claim 1, wherein the cover layer contains at least one substance selected from the group consisting of polycarbonate, cellulose triacetate, and polyethylene terephthalate.

8. The optical information recording medium of claim 1, wherein the surface on the side disposed with the cover layer has a center surface average roughness (SRa1) of no greater than 1.5 nm when measured over a large surface area and a center surface average roughness (SRa2) of no greater than 1.5 nm when measured over a minute surface area.

9. The optical information recording medium of claim 1, wherein the radiation-curable resin contained in the overcoated layer is selected from the group consisting of acrylate compounds, acrylamides, methacrylate compounds, methacrylic acid amides, vinyl ethers, and vinyl esters.

* * * * *